(12) United States Patent
Watanabe et al.

(10) Patent No.: US 6,632,489 B1
(45) Date of Patent: Oct. 14, 2003

(54) MONILIFORM SILICA SOL, PROCESS FOR PRODUCING THE SAME, AND INK-JET RECORDING MEDIUM

(75) Inventors: Yoshitane Watanabe, Funabashi (JP); Yoshiyuki Kashima, Funabashi (JP); Kiyomi Ema, Funabashi (JP); Yutaka Ohmori, Funabashi (JP)

(73) Assignee: Nissan Chemical Industries, Ltd., Tokyo (JP)

(*) Notice: Subject to any disclaimer, the term of this patent is extended or adjusted under 35 U.S.C. 154(b) by 0 days.

(21) Appl. No.: 09/763,965

(22) PCT Filed: Sep. 8, 1999

(86) PCT No.: PCT/JP99/04860

§ 371 (c)(1), (2), (4) Date: Feb. 28, 2001

(87) PCT Pub. No.: WO00/15552

PCT Pub. Date: Mar. 23, 2000

(30) Foreign Application Priority Data

Sep. 10, 1998 (JP) .............................. 10-256345
Sep. 28, 1998 (JP) .............................. 10-273691

(51) Int. Cl.$^7$ ................................................ B32B 3/00
(52) U.S. Cl. ................................ 428/32.34; 252/184
(58) Field of Search ........................... 252/184, 195, 252/323, 331; 428/32.34

(56) References Cited

U.S. PATENT DOCUMENTS

| | | |
|---|---|---|
| 2,680,721 A | 6/1954 | Broge et al. |
| 2,900,348 A | 8/1959 | Ahlberg et al. |
| 4,959,113 A | 9/1990 | Roberts |
| 5,521,497 A | 5/1996 | Schneider et al. |
| 5,597,512 A * | 1/1997 | Watanabe et al. ........ 252/315.6 |
| 5,997,620 A | 12/1999 | Kodama et al. |

FOREIGN PATENT DOCUMENTS

| | | |
|---|---|---|
| EP | 0 845 512 A1 | 6/1998 |
| JP | A 60-204390 | 10/1985 |
| JP | A 60-219084 | 11/1985 |
| JP | A 61-19389 | 1/1986 |
| JP | A 1-317115 | 12/1989 |
| JP | A 2-276671 | 11/1990 |
| JP | A 4-201286 | 7/1992 |
| JP | A 6-92011 | 4/1994 |
| JP | A 7-221059 | 8/1995 |
| JP | A 7-276789 | 10/1995 |
| JP | A 10-204416 | 8/1998 |

OTHER PUBLICATIONS

U.S. patent application Ser. No. 09/605,542, Ota et al., filed Jun. 29, 2000.

D. Koppel, "Analysis of Macromolecular Polydispersity in Intensity Correlation Spectroscopy: The Method of Cumulants", *The Journal of Chemical Physics*, vol. 57, No. 11, Dec. 1, 1972, pp. 4814–4820.

\* cited by examiner

Primary Examiner—Bruce H. Hess
Assistant Examiner—Michael E. Grendzynski
(74) Attorney, Agent, or Firm—Oliff & Berridge, PLC

(57) ABSTRACT

A stable silica sol having an $SiO_2$ concentration of 1 to 50% by weight and containing liquid-medium dispersed moniliform colloidal silica particles each having 3 or more as a ratio of $D_1/D_2$ of a particle diameter ($D_1$ nm) measured by a dynamic light scattering method to a mean particle diameter (a particle diameter measured by a nitrogen absorption method: $D_2$ nm) where $D_1$ is 50 to 500 nm, and which are comprised by spherical colloidal silica particles having a mean particle diameter of 10 to 80 nm and metal oxide-containing silica bonding these spherical-colloidal silica particles, and in which the spherical colloidal silica particles link in rows in only one plane, process for producing such and a coating composition for ink receiving layers containing such a silica sol and an ink jet recording medium.

5 Claims, 3 Drawing Sheets

MONILIFORM SILICA SOL, PROCESS FOR PRODUCING THE SAME, AND INK-JET RECORDING MEDIUM

TECHNICAL FIELD

In one aspect, the present invention relates to moniliform (Rosary shaped) silica sol and to a method for producing it.

And in a second aspect, the present invention relates to an ink jet recording medium on which recording is performed with a water-base ink and more particularly to a coating composition for an ink receiving layer containing moniliform silica sol and having high ink absorption and to an ink jet recording medium having such an ink receiving layer.

The moniliform silica sol has a feature in the form of colloidal silica particles thereof and exhibits excellent film formation and porosity when dried on the surface of a solid article and is used in various fields as microfiller for various coating agents, a binding agent, a modifier, a carrier for catalysts and the like.

BACKGROUND ART

A silica sol has a general property that it finally gels from its low viscosity state via its high viscosity state. Accordingly, for silica sol products having the same $SiO_2$ content, ones having a lower viscosity are evaluated to have a higher stability than others having a higher viscosity. In addition, silica sol containing colloidal silica particles with a more spherical shape has been known to have a lower viscosity. Under this situation, there have heretofore been various proposals for efficiently preparing spherical colloidal silica sols, but there is no proposal up to the present for improving the characteristic of a silica sol by controlling the shape of the colloidal silica particles as dispersed in the silica sol to be non-spherical.

Regarding the shape of the conventional colloidal silica particles, U.S. Pat. No. 2,680,721 mentions three typical types of particles in the drawings as attached thereto. The first is a spherical one as mentioned above, which is shown in FIG. 1 thereof; the second is a non-spherical one having a ratio of the major axis to the minor axis of almost from 2 to 3, which is shown in FIG. 2, bottom view thereof; and the third is an-amorphous one, which is shown in FIG. 3, bottom view thereof. The random-shaped particles of the third type are ones resulting from growth of the fragments formed by cleavage of the chain of a three-dimensional network structure derived from chain-like linkage of smaller silica particles, as so explained in the said U.S. Pat. No. 2,680,721. When attention is-paid to one particle of such type, it is noted that it has a non-spherical shape but the shape is not controlled.

The above-mentioned U.S. Pat. No. 2,680,721 has disclosed a method of forming a silica sol comprising spherical colloidal silica particles where a monovalent base is added to spherical silica sol having a particle diameter of 5 nm or more so that the pH value of the sol may be within the range of from 7 to 10.5 and the sol is heated at 160 to 300° C. in the absence of electrolytes.

U.S. Pat. No. 2,900,348 has disclosed a method of forming a silica sol where a silica gel formed by adding an acid to an aqueous solution of water glass is washed with water, an alkali is added to the silica gel so that the silica gel may have a pH value of from 9 to 9.5, and the silica gel is then heated at 95 to 100° C. The said method is a so-called peptization method, and the colloidal silica particles of the silica sol prepared by the method has a shape of the above-mentioned second or third type.

U.S. Pat. No. 5,221,497 (corresponding Japanese application: JP-A 1-317115) discloses a method for producing elongated-shaped silica sol containing elongate shaped particles by adding water-soluble calcium salt, magnesium salt or mixtures thereof to an aqueous colloidal solution of active silicic acid or acidic silica sol having a mean particle diameter of 3 to 30 nm in an amount of 0.15 to 1.00 wt. % based on CaO, MgO or both to silica, then adding an alkali metal hydroxide so that the molar ratio of $SiO_2/M_2O$ (M: alkali metal atom) becomes 20 to 300, and heating the obtained liquid at 60 to 300° C. for 0.5 to 40 hours. The colloidal silica particles obtained by this method are elongate shaped silica particles that have elongations of a uniform thickness within the range of 5 to 40 nm extending in only one plane.

The ink jet recording process is a process in which ink droplets ejected at high speeds from nozzles are applied onto a recording material to record images/characters. This process is used in various fields such as, various printers, facsimile devices, and computer terminals since it is relatively fast, less noisy and easy full-colorization in recording treatment.

In this process, the ink used contains a large amount of solvent so that a large amount of ink must be used in order to obtain high recording density. In addition, since ink droplets are continuously ejected, there tends to occur a drawback that first ink droplets have not been completely absorbed when next droplets are ejected and the both ink droplets fuse, causing conjugation of ink dots. Therefore, the recording paper and sheet used in this ink jet recording process is required to give printing dots that are high in density, light in hue and sharp and to absorb ink at high rates to cause no blurring.

Paper can absorb ink by itself and hence it is possible to make recording on it as it is by ink jet process. However, to obtain high recording density, it is necessary to provide an ink receiving layer by coating on it. Moreover, to make recording on a sheet that does not absorb ink, such as synthetic paper or PET (polyethylene terephthalate) film used in OHP by an ink jet process, it is indispensable to provide an ink receiving layer by coating on it.

Hitherto, it has been attempted to improve ink absorbability, absorption speed, coloring properties, high density printing, and the like by provision of an ink receiving layer on paper or a sheet by coating thereon a coating agent obtained by using porous pigment, silica sol, alumina sol and the like singly or in admixture and adding an aqueous resin binder thereto and drying.

For example, JP-A 61-19389 proposes an ink receiving layer that comprises anionic spherical colloidal silica and polyvinyl alcohol, and JP-A 60-219084 proposes an ink receiving layer that comprises cationic spherical colloidal silica, precipitated silica powder and an aqueous resin such as polyvinyl alcohol.

JP-A 4-201286 describes an ink receiving layer composition composed mainly of a water-dispersible polymer, colloidal silica linked in a moniliform and/or branched chain forming, and other particulate. JP-A 6-92011 describes an ink receiving layer composition composed of a cation-modified non-spherical colloidal silica and polyvinyl alcohol. JP-A 60-204390 proposes a method of using silica obtained by a gas phase process having a primary particle diameter of 10 to 30 nm after-secondary coagulation thereof. JP-A 7-276789 also proposes an ink receiving layer of a three-dimensional network structure having a porosity of 50 to 80% formed from silica fine particulate having a mean primary particle diameter of 10 nm or less and a water-soluble resin. Further, JP-A 2-276671 proposes an ink receiving layer that comprises a layer composed of porous alumina hydrate having provided thereon a layer of porous fine particulate silica.

Various methods described above generally form vacant spaces in the film of a receiving layer and have ink absorbed therein. At the same time, as a binder itself used for forming the receiving layer, those of the type in which ink is absorbed and held by swelling action are used widely. That is, the ink receiving layer is formed by appropriately mixing the filler having large vacant space and the binder that absorbs ink.

In the above example, the conventional colloidal silica has the drawbacks that the amount of vacant space is too small to absorb ink sufficiently and in addition, making the film thickness larger will lead to the occurrence of cracks in the film or a decrease in the strength of the film.

Where silica powder is used, the amount of ink absorption is sufficiently large. However, it has disadvantages that silica powder itself has no binding power so that the strength of film is not obtained unless the amount of aqueous resin is increased and that the luster of film surface is lost.

Sol composed of spherical colloidal silica particles having a particle diameter of 4 to 150 nm is highly stable and has been used in various fields of application. The spherical shape of particles that gives good dispersibility could, in some cases, cause practical problems, for example, that cracks tend to be made in the film formed from the silica sol containing composition, or that when a composition containing the silica sol.and ceramic fiber is dried, migration of colloidal silica is caused so that the surface of the dried product tends to become powdery. If such problems arise, improvement is attempted by adding additional component to the silica sol. However, it is not easy to achieve sufficient improvement.

Where it is used in a catalyst carrier, the ink receiving layer of ink jet recording paper or film and the like spherical silica sol may provide insufficient space. Accordingly, a method is used in which an appropriate gelling agent is used in order to increase space. However, control is not easy.

The silica sol obtained by ordinary peptization method has insufficient stability and may form precipitation of silica during storage as the case maybe. Although the colloidal silica particles are non-spherical, they also cause the problem that would occur when the silica sol composed of the above spherical colloidal silica particles is used.

It has been practiced to produce a dispersion of colloidal silica particles (silica sol) of a three-dimensional silica sol structure by wet pulverizing fumed silica or precipitated silica powder. In this case, however, use of the silica sol is limited since it has no binding power, it is short in transparency and so on.

DISCLOSURE OF THE INVENTION

A first embodiment of the present invention is to provide stable silica sol showing improved properties in film-forming property, binding property, porosity and the like by modifying the shape of colloidal silica particles and further a method of efficiently producing silica sol relating to the improvement.

A second embodiment of the present invention has been achieved in view of the above-described prior art. Its object is to provide a coating composition for an ink receiving layer for use in ink jet recording medium (ink jet recording paper and sheet) that has high ink absorbability and enables high quality image formation in ink jet type printing with aqueous or oil ink as well as an ink jet recording medium having such an ink receiving layer.

The silica sol of the first embodiment of the present invention has an $SiO_2$ concentration of 50% by weight or less and is stable. It is characterized in that the shape of colloidal silica particles dispersed in the liquid medium of the silica sol has a size of 50 to 500 nm as a particle diameter $D_1$ as measured by a dynamic light scattering method, that when observed with an electronic microscope, the particles comprise spherical colloidal silica particles, and silica bonding the spherical colloidal silica particles and the spherical colloidal silica particles are linked in rows in only one plane, and that the particles are moniliform each having 3 or more as a ratio of $D_1/D_2$ of the above-mentioned $D_1$ to a mean particle diameter (a particle diameter measured by a nitrogen absorption method) $D_2$ as a degree of linking in rows.

A method for producing a stable silica sol having an $SiO_2$ concentration of 5 to 40% by weight and containing liquid-medium dispersed moniliform colloidal silica particles each having 3 or more as a ratio of $D_1/D_2$ of a particle diameter ($D_1$ nm) measured by a dynamic light scattering method to a mean particle diameter of the spherical colloidal silica (a particle diameter measured by a nitrogen absorption method: $D_2$ nm) where $D_1$ is 50 to 500 nm, and which are composed of spherical colloidal silica particles having a mean particle diameter of 10 to 80 nm and metal oxide-containing silica bonding these spherical colloidal silica particles, and in which the spherical colloidal silica particles link in rows in only one plane, can be efficiently obtained by a production process comprising the steps (a), (b), (c) and (d) below:

(a) adding an aqueous solution containing a water-soluble II valent metal salt or a water-soluble III valent metal salt singly or in admixture to an active silicic acid-containing aqueous colloidal liquid or an acidic silica sol having a mean particle diameter of 3 to 8 nm, each containing 0.5 to 10% by weight of $SiO_2$ and having a pH of 2 to 6, in an amount of 1 to 10% by weight as a metal oxide (MO in the case of the II valent metal salt and $M_2O_3$ in the case of the III valent metal salt, provided that M represents a II valent or III valent metal atom and O represents an oxygen atom) based on $SiO_2$ in the aqueous colloidal solution of active silicic acid or acidic silica sol and mixing them, (b) adding acidic spherical silica sol having a mean particle diameter of 10 to 80 nm and a pH 2 to 6 to the mixed liquid (a) obtained in the step (a) in such an amount that a ratio of a silica content (A) derived from the acidic spherical silica sol to a silica content (B) derived from the mixed liquid (b), A/B (weight ratio), is 5 to 100 and that total silica content (A+B) of a mixed liquid (b) obtained by mixing the acidic spherical silica sol with the mixed liquid (a) is an $SiO_2$ concentration of 5 to 40% by weight in the mixed liquid (b) and mixing them, (c) adding an alkali metal hydroxide, water-soluble organic base or water-soluble silicate to the mixed liquid (b) obtained in the step (b) such that pH becomes 7 to 11 and mixing them, and (d) heating the mixed liquid (c) obtained in the step (c) at 100 to 200° C. for 0.5 to 50 hours.

The shape of colloidal silica particles constituting the silica sol of the first embodiment of the present invention can be observed in a photograph taken with using an electronic microscope. A number of colloidal silica particles present in the silica sol have a moniliform shape in common though such a shape is, not limited to the same shape. The numerous colloidal silica particles are roughly classified into four groups of shapes; the first almost straight, the second angled, the third branched and the fourth having ring, though the proportion thereof is difficult to be represented by accurate numerals. In accordance with the photographs, however, it is noted that the amounts of the angled type and the branched type occupy major portions of the colloidal silica particles.

When attention is paid to one colloidal silica particle, the particle comprises spherical colloidal silica particles corresponding to moniliform sphere and silica of a bonding portion corresponding to thread. The bonding portion is constricted. That is, paying attention to two linked particles only, they are of a dumbbell form. That the colloidal silica particles of the present invention are not of an elongate form but are moniliform is attributable to a difference in the process for producing silica sol. The degree of moniliform (the degree of linking in rows of spherical colloidal silica particles) varies depending on the production conditions and this degree can be determined by the empirical rule in the preparation. The shape can be expressed as moniliform (Rosary shaped) or Pearl necklace shaped.

A large number of colloidal silica in the silica sol prepared by a specified method and under specified conditions have a degree of linking in rows controlled within a certain range. The colloidal silica particles in the silica sol obtained by the production process of the first embodiment of the present invention are colloidal silica particles having a mean particle diameter of 10 to 80 nm linked in rows and the length of a large number of colloidal silica particles in the silica sol is unsettled. However, referring to the photographs, the length is 5 times the size of the sphere or more and majority of the particles are those particles having a length usually 5 to several tens times the size of the sphere.

The moniliform colloidal silica as described above constituting the silica sol.of the first embodiment of the present invention has another feature. It is that the moniliform linkings in rows exist in the same plane. Since they are linked in rows in one and the same plane regardless of whether they are angled or branched, all the particles can be laid on the same plane at a height corresponding to the size of spherical colloidal silica particles in the particles even when the shapes of the particles are different provided that the particles do not overlap each another. Electromicrographic photographs show that the colloidal silica particles of the first embodiment of the present invention tend to overlap one another and therefore, one end and the other end of one particle hardly can be observed definitely so that the length of the particle could hardly be determined. However, if there is any linking in rows of colloidal silica particles in three-dimensional directions, the particles form a cluster as can be judged on a photograph. Although one or two spherical silica particles that link in rows in three-dimensional directions, basically it can be said that there is no long linking in rows in three-dimensional directions fundamentally.

The size of the above colloidal silica particles constituting the silica sol of the first embodiment of the present invention is inappropriate to be represented by the length which could be presumed from an electron micrograph but it is appropriate to be represented by the value as measured by dynamic light scattering method where the.particle diameter may be determined as a size of the particle corresponding to the length. The method for measuring particle diameters by the dynamic light scattering method is explained in Journal of Chemical Physics, Vol. 57, Number 11 (December of 1972) p.4814. For example, the particle diameter may easily be measured by the use of a commercially available apparatus called model N4 produced by Coulter Electronics, Inc. The particle diameter ($D_1$) as the size of the colloidal silica particles constituting the silica sol of the first embodiment of the present invention is 50 to 500 nm as expressed in terms of a measured value by the dynamic light scattering method.

The mean particle diameter ($D_2$) of the spherical colloidal silica particles constituting the colloidal silica particle of the first embodiment of the present invention can be given from a specific surface area S $m^2/g$ measured by an ordinary nitrogen absorption method (BET method) according to the formula of $D_2=2720/S$.

Therefore, the ratio of $D_1/D_2$ of the particle diameter $D_1$ nm measured by the above dynamic light scattering method to the above $D_2$ nm represents a degree of linking in rows of moniliform colloidal silica particles (a degree of length). The silica sol of the first embodiment of the present invention has 3 or more, usually 4 to 20 in the terms of the ratio $D_1/D_2$.

The silica bonding the spherical colloidal silica particles constituting the silica sol of the first embodiment of the present invention contains a small amount, 0.5 to 10% by weight of II valent or III valent metal oxide based on the $SiO_2$ in the silica sol used in the bonding depending on the production process of the silica sol. However it is substantially amorphous silica.

The silica sol of the first embodiment of the present invention generally contains 50% by weight or less, preferably 5 to 40% by weight of $SiO_2$. Since the silica sol of the first embodiment of the.present invention is constituted by spherical colloidal silica particles linked in rows in a moniliform shape in one and the same plane, the viscosity of the silica sol of the first embodiment of the present invention is higher than that of the spherical silica sol. The viscosity of the silica sol is higher at a higher degree of linking in rows of spherical colloidal silica particles and at a higher content of $SiO_2$ in the silica sol. In the $SiO_2$ concentration of 50% by weight or less as described above, it is about several mPa·s to about 1,000 mPa·s at a room temperature. The silica sol is highly stable at such a high viscosity and causes no precipitation of silica nor gelling during storage.

The silica sol may have any one of water, organic solvents, solutions of water and a water-soluble organic solvent, as its medium. Both of the aqueous silica sol having water as its medium and the organosilica sol having an organic solvent as its medium are active due to silanol groups existing on the surface of colloidal silica particles, and the silica sol finally and irreversibly changes to a silica gel as the medium is removed. As the organic solvents to be used as a medium of organosilica sol, any and every, conventional one which does not interfere with the activity of the colloidal silica particles can be used. For example, such solvents include alcohols such as methanol, ethanol, isopropanol, and butanol, polyhydric alcohols such as ethylene glycol, ethers such as dimethyl ether and monomethyl ether of ethylene glycol, hydrocarbon solvents such as toluene and xylene, dimethylacetamide, dimethylformamide, and the like.

The silica sol of the first embodiment of the present invention, in which colloidal silica particles are constituted by acidic spherical colloidal silica particles linked in rows in a moniliform shape having a mean particle diameter of 10 to 80 nm and a pH of 2 to 6 and which have a particle diameter of 50 to 500 nm by a dynamic light scattering method is first obtained as alkaline aqueous silica sol through the steps of (a), (b), (c) and (d) as described above.

The active silicic acid-containing aqueous colloidal liquid to be used in the step (a) is a liquid containing both silicic acid and particles of silicic acid polymer having a particle diameter of less than 3 nm, and it may be easily prepared by a known method. One preferred active silicic acid-containing aqueous colloid liquid is obtained by conventional cation exchange treatment of a diluted aqueous solution of a water-soluble silicate, for example, water glass having a molar ratio of $SiO_2/M_2O$ (where M represents an alkali metal atom and O represents an oxygen atom) from about 2 to about 4, and generally, it contains 0.5 to 5% by weight of the water-soluble silicate and have a pH of 6 or less, preferably 2 to 6. The pH can be easily adjusted, for example, by keeping back a part of the cations in the reaction system after cationic exchange treatment of the said water glass-containing aqueous solution, or by adding a small amount of alkali metal hydroxide or water-soluble organic base to the resulting active silicic acid-containing aqueous colloid liquid after removal of all or a part of the cations from the cationic exchange treatment. The aqueous colloid solution of active silicic acid is unstable and has a property of easily gelling so that the one immediately after preparation is preferred. As far as the intended silica sol of the first embodiment of the present invention can be obtained, the active silicic acid-containing aqueous colloid liquid of active silicic acid may contain any other components and may also contain trace amounts of cations and anions.

The particle diameter of the acidic silica sol having a mean particle diameter of 3 to 8 nm used in the step (a) is difficult to measure by a nitrogen absorption method and thus, generally a Shears method is adopted.

In the nitrogen absorption method, silica sol is dried and specific surface area of its powder is measured by the nitrogen absorption method. Where the mean particle diameter is small, colloidal particles bind to each other upon drying, resulting in a decrease in specific surface area, so that it is difficult to measure true values. The Shears method is the Shears titration method described in Analytical Chemistry, vol. 28, No. 12 (1956) p. 1981 and measurement is performed in a liquid state so that true values can be measured.

The acidic silica sol having a mean particle diameter of 3 to 8 nm, an $SiO_2$ concentration of 0.5 to 10% by weight and a pH of 2 to 6 may be those prepared by the known methods described in, for example, U.S. Pat. Nos. 268,071 and 2,900,348, and JP-B 4-55127. The shape of colloidal silica particles may be spherical or non-spherical as far as the ratio of $D_1/D_3$ of the measured particle diameter ($D_1$) by the dynamic light scattering method to the particle diameter ($D_3$) measured by the Shears method—particle diameter is less than 5. However, in order to obtain homogeneous moniliform silica sol, it is preferred to use silica sol having a small measured particle diameter by the dynamic light scattering method. The acidic silica sol can be obtained by subjecting alkaline silica sol to cationic exchange treatment, and its pH can be easily adjusted, when the above alkaline silica sol is subjected to cationic exchange treatment, by retaining a part of the cation therein or by adding a small amount of alkali metal hydroxide, water-soluble organic base or the like to the obtained acidic silica sol after removing all or a part of the cation therein. As the acidic silica sol, a commercially available preparation may be used.

In the step (a), a water-soluble II valent metal salt or a water-soluble III valent metal salt singly or in admixture, preferably as an aqueous solution thereof, is added to an active silicic acid-containing aqueous colloid liquid of having a pH of 2 to 6 or an acidic silica sol having a mean particle diameter of 3 to 8 nm. The amount of the water-soluble II or III valent metal salt is 1 to 10% by weight as a metal oxide (MO in the case of the II valent metal salt and $M_2O_3$ in the case of the III valent metal salt, provided that M represents a II valent or III valent metal atom and O represents an oxygen atom) based on $SiO_2$ in the active silicic acid-containing aqueous colloid liquid of active silicic acid or the acidic silica sol. The addition is performed advantageously with stirring. The mixing temperature and time are not particularly limited and may be from about 2 to about 50° C. for about 5 minutes to about 1 hour. The II or III valent metal salt to be added includes chlorides, inorganic acid salts and organic acid salts, such as nitrates, sulfates, sulfamates, formates, acetates, etc., of Ca, Mg, Sr, Ba, Zn, Sn, Pb, Ni, Co, Fe, Al, In, Y, Ti and the like.

In the step (b), acidic spherical silica sol having a mean particle diameter of 10 to 80 nm and a pH of 2 to 6 is added to the mixed liquid (a) obtained in the above step (a). The acidic spherical silica sol having a mean particle diameter (particle diameter measured by a nitrogen absorption method: $D_2$ nm) of 10 to 80 nm and a pH of 2 to 6 may be the one prepared from water glass or alkyl silicate as raw materials by any optional process conventionally known. Alternatively, as the acidic spherical silica sol, a preparation commercially available as an industrial material may be used. Where the commercially available silica sol is alkaline, an acidic silica sol can be easily obtained by subjecting the alkaline sol to cation exchange treatment. As such a silica sol there may be the one having an $SiO_2$ concentration of 10 to 50% by weight. The silica sol usually has less than 2 in terms of a ratio of $D_1/D_2$ of the measured particle diameters $D_1$ and $D_2$ by the dynamic light scattering method and it is preferred that silica sol having as small as possible a value of this ratio be used. The addition of the silica sol is performed preferably as soon as possible after the completion of the step (a) and with stirring. The temperature and time of the mixing are not particularly limited and may be about 2 to about 50° C. for about 5 minutes to about 1 hour.

The amount of the acidic spherical silica sol having a mean particle diameter of 10 to 80 nm added in the step (b) is such an amount that a ratio, A/B (weight ratio), of a silica content (A) derived from the acidic spherical silica sol to a silica content (B) derived from the mixed liquid (a) obtained by step (a) is 5 to 100 and that total silica content (A+B) of a mixed liquid (b) obtained by step (b) is 5 to 40% by weight as $SiO_2$ concentration.

In the step (c), an alkali metal hydroxide, water-soluble organic base or water-soluble silicate is added to the mixed liquid (b) obtained in the step (b). The addition is preferably effected as soon as possible immediately after the completion of the step (b), with stirring. Although not particularly limited, the temperature of the mixing may be from about 2 to about 50° C. and the time may be from about 5 minutes to about 1 hour in the mixing procedure. It is preferred that the alkali metal hydroxide, water-soluble organic base or water-soluble silicate is mixed with the liquid obtained in the step (b) preferably uniformly and added directly or in the form of an aqueous solution. The alkali metal hydroxide includes, for example, sodium, potassium, lithium and hydroxides. The water-soluble organic base includes, for example, quaternary ammonium hydroxides such as tetraethanolammonium hydroxide, monomethyltriethanolammonium hydroxide, and tetramethylammonium hydroxide, amines such as monoethanolamine, diethanolamine, triethanolamine, piperazine and morpholine. Examples of the water-soluble silicate include sodium silicate, potassium silicate, quaternary ammonium silicates that comprises the base component of the above-mentioned quaternary ammonium hydroxides and the like. The alkali metal hydroxides, water-soluble organic bases and water-soluble silicates may be used as a mixture thereof.

In the step (c), the addition amount of the above-mentioned alkali metal hydroxide, organic base or water-soluble silicate is such that the pH of the mixed liquid (c) obtained by the step (c) is 7 to 11. When the alkalimetal atom of this alkali metal hydroxide or the molecule of the organic base molecule is represented by "M", the amount of alkali metal hydroxide, the organic base or the water-soluble silicate to be added is such that the amount of alkali metal or organic base in the mixed liquid obtained in the step (c) is 50 to 800 for a molar ratio of $SiO_2/M_2O$ based on the silica content in the mixed liquid (c) obtained by the step (c).

In the step (d), the mixed liquid (c) obtained by the above-mentioned step (c) is heated. This heating is effected at 100 to 200° C. and the heating time is required to be from about 0.5 to 50 hours. The heating is preferably conducted with stirring the above-mentioned liquid and possibly under the conditions where the evaporation of water is not generated.

Upon heating the mixed liquid (c), necessary power per unit volume for the stirring is 0.01 to 5 $kW/m^3$. In particular, if the necessary power per unit volume is set to 0.01 to 0.10 $kW/m^3$, generation of wet silica gel in the silica sol can be suppressed and hence such is preferred.

By this heating, the spherical colloidal silica particles (particle diameter $D_2$) and the silica bonding the spherical colloidal silica particles to each other bond through dehydration-condensation reaction and the silica particles link in rows in one plane only to generate moniliform colloidal silica particles having a particle diameter ($D_1$) measured by the dynamic light scattering method of 50 to 500 nm and 3 or more in terms of the ratio of $D_1/D_2$.

Therefore, although the liquid obtained is silica sol, it has $SiO_2$ concentration of generally 5 to 40% by weight. Where the concentration is low, further concentration is possible. In this case, it is preferable to remove, from the silica sol obtained in the step (d), the anions in such an amount that would interference with the stabilization of silica sol if they are present in the cencentrated silica sol or in any excess amount more than that amount. For removing the anions, there are methods in which a microfine porous film such as ultrafiltration membrane or reverse osmosis membrane are used and a method which uses an ion exchange resin. The silica sol obtained by the step (d) or silica sol after the concentration may be adjusted of pH by suitably adding an alkali as much as is desired.

The silica sol obtained by the step (d) above or silica sol obtained by removing suitable amounts of anions or anions and water from the former has an $SiO_2$ concentration of from 10 to 50% by weight, a viscosity of from about several mPa·s to about 1,000 mPa·s at room temperature and a pH of 8 to 11. Although the silica sol still contains 100 to 2,000 ppm of anions, but it is extremely stable. The silica sol contains an alkali metal ion or organic base in an amount of 50 to 800 in the molar ratio of an $SiO_2/M_2O$ (where M represents an alkali metal atom or an organic base and O represents an oxygen atom) and further contains a II valent or III valent metal in an amount of about 100 to about 10,000 ppm as metal oxide based on $SiO_2$.

The colloidal silica particles in the silica sol have the shape and the size of those already formed by the step (d) and they contain the II or III valent metal oxide in the above silica sol. Their chemical analyses can be easily conducted by ordinary method. The particle diameter of the colloidal silica particles may be easily measured by the dynamic light scattering method or a commercially available apparatus and is 50 to 500 nm.

The silica sol obtained by the method according to the first embodiment of the present invention is finally and irreversibly converted into silica gel by removal of water therefrom. Although the silica sol is alkaline aqueous silica sol, it may be converted into acidic aqueous silica sol by cationic exchange treatment thereof. When a different alkali is added to the above-mentioned alkaline aqueous sol, another alkaline aqueous silica sol which is different from the above-mentioned alkaline aqueous sol can be obtained. The acidic silica sol is preferred to have a pH of from 2 to 4. From the alkaline aqueous silica sol or the acidic aqueous silica sol, an aqueous silica sol comprising positively charged colloidal silica particles can be obtained by an ordinary method. Further, an organosilica sol can be obtained from the said aqueous sols by substituting the water as the medium thereof with an organic solvent by an ordinary method, for example, a distillation substitution method. In any of the acidic aqueous silica sol, aqueous sol comprising positively charged particles and organosilica sol, their colloidal silica particles retain the shape already formed in the step (d) and finally and irreversibly converted to silica gel by removal of the medium therefrom.

For each type of alkaline aqueous silica sol, acidic aqueous silica sol and positively charged silica sol, a stable silica sol can be obtained by mixing the silica sol of the same type according to the first embodiment of the present invention and conventional silica sol (s). Regarding the organosilica sol, a stable silica sol may be obtained by mixing the silica sol according to the first embodiment of the present invention and conventional silica sol (s), provided that the solvents in the sols to be mixed are compatible with each other so as not to cause coagulation of colloidal silica particles in the mixed solvent.

The fact that the colloidal silica particles in the silica sol have a moniliform shape, moreover, the spherical colloidal silica particles having a mean particle diameter of 10 to 80 nm have the being in a moniliform shape in such a manner that they are linked in rows in only one plane with 3 or more in terms of the above-mentioned ratio of $D_1/D_2$ and have 50 to 500 nm of the particle diameter measured by the dynamic light scattering method is caused by the method for producing silica sol according to the first embodiment of the present invention. Although it is difficult to completely clarify the mechanism of forming the colloidal silica particles is difficult.

First, in the step (a), when a water-soluble II valent metal salt or a water-soluble III valent metal salt is added singly or in admixture to an active silicic acid-containing aqueous colloid solution of having a pH of 2 to 6 or an acidic silica sol having a mean particle diameter of 3 to 8 nm, the II or III valent metal ions are captured by the silanol groups on the surface of the colloid of active silicic acid or of colloidal silica particles having a mean particle diameter of 3 to 8 nm. That is, in the mixed liquid (a) obtained by the step (a), the colloid of active silicic acid or colloidal silica particles having a mean particle diameter of 3 to 8 nm are totally negatively charged on their surface but partially positively charged.

In the step (b), when acidic spherical silica sol having a mean particle diameter of 10 to 80 nm and a pH of 2 to 6 is added to the mixed liquid (a) obtained by the step (a), the colloid of active silicic acid or colloidal silica particles having a mean particle diameter of 3 to 8 nm, partly positively charged, obtained by the step (a) are electrically or physically adsorbed onto the surface of negatively charged colloidal silica particles having a mean particle diameter of 10 to 80 nm. In this stage, no coagulation in a moniliform shape has generated.

In the step (c), when the alkali metal hydroxide, water-soluble organic base or water-soluble silicate is added to the mixed liquid (b) obtained in the step (b) such that pH is 7 to 11, the colloidal silica particles having a mean particle diameter of 10 to 80 nm having adsorbed thereon the colloid of active silicic acid or colloidal silica particles having a mean particle diameter of 3 to 8 nm obtained by the step (b) and having partially positive charges on the surface thereof adsorb alkali metal ions or organic bases through the silanol groups thereof and causes coagulation in the presence of the II or III valent metal ions. The coagulation includes moniliform aggregation and three-dimensional gel-like aggregation. However, in this stage, the colloid is not bound.

In the step (d), the colloidal silica particles in the mixed liquid (c) obtained in the step (c) will change at an increasing temperature such that the three-dimensional silica gel is peptized to form silica sol and moniliform coagulation proceeds in only one plane, and the spherical colloidal silica particles having a mean particle diameter of 10 to 80 nm and the colloid of active silicic acid or colloidal silica particle having a mean particle diameter of 3 to 8 nm bond to each other by dehydration-condensation. On this occasion, due to the balance between the spherical colloidal silica particles having a mean particle diameter of 10 to 80 nm and the colloid of active silicic acid containing a metal oxide or colloidal silica particles having a mean particle diameter of 3 to 8 nm that bond the spherical colloidal silica particles, and as a result of a series of processes, moniliform colloidal silica particles in which spherical colloidal silica particles having a mean particle diameter of 10 to 80 nm linked in rows in only one plane and have each a particle diameter of 50 to 500 nm measured by the dynamic light scattering method and have 3 or more in the terms of the ratio are produced.

In the second embodiment of the present invention, it has been found that use of moniliform shaped colloidal silica particles in which spherical colloidal silica particles having a mean particle diameter of 10 to 50 nm are linked in rows from among the above-described moniliform silica sols in a coating composition for ink receiving layer containing an aqueous resin results in an increased ink absorption, a fast absorption speed and an improved color development of ink.

The second embodiment of the present invention relates to a coating composition for ink receiving layer in ink jet recording comprising a silica sol containing water dispersed moniliform colloidal silica particles each having 3 or more as a ratio of $D_1/D_2$ of a particle diameter ($D_1$ nm) measured by a dynamic light scattering method to a mean particle diameter (a particle diameter measured by a nitrogen absorption method: $D_2$ nm) where $D_1$ is 50 to 500 nm, and which are composed of spherical colloidal silica particles having a mean particle diameter of 1o to 50 nm and metal oxide-containing silica bonding these spherical colloidal silica particles, and in which the spherical colloidal silica particles link in rows in only one plane and an aqueous resin.

It further relates to an ink jet recording medium comprising an ink receiving layer containing moniliform colloidal silica particles each having 3 or more as a ratio of $D_1/D_2$ of a particle diameter ($D_1$ nm) measured by a dynamic light scattering method to a mean particle diameter (a particle diameter measured by a nitrogen absorption method: $D_2$ nm) where $D_1$ is 50 to 500 nm, and which are composed of spherical colloidal silica particles having a mean particle diameter of 10 to 50 nm and metal oxide-containing silica bonding these spherical colloidal silica particles, and in which the spherical colloidal silica particles link in rows in only one plane and an aqueous resin.

Hereinafter, the process for producing moniliform silica sol according to the first embodiment of the present invention will be described in detail.

The active silicic acid-containing aqueous colloid liquid or acidic silica sol having a mean particle diameter of 3 to 8 nm which is used in the step (a) may have an $SiO_2$ concentration of less than 0.5% by weight. In this case, however, the $SiO_2$ concentration of the acidic spherical silica sol having a mean particle diameter of 10 to 80 nm used in the step (b) must be high and therefore, such a concentration is not efficient. On the other hand, when the above $SiO_2$ concentration exceeds 10% by weight, gellation is caused or coagulation of colloidal silica particles proceeds too much in the step (a) and accordingly it is not preferable. In the step (a), smaller aggregation of colloid of active silicic acid or colloid silica particle having a mean particle diameter of 3 to 8 nm is preferable.

The active silicic acid-containing aqueous colloid liquid or silica sol having a mean particle diameter of 3 to 8 nm may preferably have a pH of 2 to 6. The pH may be less than 2 but is not preferred since the II or III valent metal ions added in the step (a) and adsorbed on the colloidal silica particles tend to be desorbed with an excess of acid. A pH exceeding 6 is not preferable since the coagulation of colloidal silica particles in the step (a) proceeds too much.

In the step (a) if the colloidal silica in the acidic silica sol used therein has a mean particle diameter exceeding 8 nm, the reactivity in the step (d) is insufficient, thus failing to give the intended moniliform colloidal silica particles. Therefore, it is not preferable.

In the step (a), when an aqueous solution containing a water-soluble II valent metal salt or a water-soluble III valent metal salt is added singly or in admixture to an active silicic acid-containing aqueous colloid liquid or an acidic silica sol having a mean particle diameter of 3 to 8 nm, uniform mixing can be easily achieved. This uniform mixing is important for the added II or III valent metal ions to be uniformly captured by the colloid of active silicic acid or a colloidal silica particle having a mean particle diameter of 3 to 8 nm.

As the II or III valent metal salt, salts of calcium or magnesium are particularly preferred. Presumably, this is because the capture of ions is performed in a preferable fashion.

In the active silicic acid-containing aqueous colloid liquid or acidic silica sol having a mean particle diameter of 3 to 8 nm in which is used in the step (a), there exist trace amounts of II or III valent metal ions derived from water glass as a raw material, diluting water for the water glass, reactor and the like. Among them, those captured on the surfaces of colloid of active silicic acid or colloidal silica particle having a mean particle diameter of 3 to 8 nm act similarly to the II or III valent metal ions added in the step (a). If the amount of the II or III valent metal salt which is singly or in admixture added in the step (a) is less than 1% by weight as a metal oxide (MO in the case of the II valent metal salt and $M_2O_3$ in the case of the III valent metal salt, provided that M represents a II valent or III valent metal atom and O represents an oxygen atom) based on $SiO_2$ in the active silicic acid-containing aqueous colloid liquid or acidic silica sol having a mean particle diameter of 3 to 8 nm, such amounts are not preferable since the degree of moniliform shape of finally produced colloidal silica particles is low. On the other hand, if that amount exceeds 10% by weight, coagulation of colloidal silica particle becomes remarkable too much, or the finally produced colloidal silica particles will have three-dimensional gel structure and thus such amounts are not preferable.

The II or III valent metal salts are added under stirring in such a manner that uniform mixing can be made easy to form an aqueous solution of an $SiO_2$ concentration of from about 5 to about 20% by weight.

If the colloidal silica particles in the acidic spherical silica sol used in the step (b) has a mean particle diameter (particle diameter by nitrogen adsorption method/$D_2$) of less than 10 nm, such diameters are not preferable since the amount of silica bonding the spherical colloidal silica particles becomes too much to obtain the intended moniliform silica sol in the final step. Further, if that particle diameter exceeds 80 nm, the moniliform colloidal silica particles in the final step will have a particle diameter measured by the dynamic light scattering method exceeding 500 nm and hence the obtained moniliform colloidal silica particles tend to be precipitated, so that it is not preferable. Therefore, the mean particle diameter of 10 to 80 nm is preferable and that of 12 to 50 nm is particularly preferable.

It is preferable that the acidic spherical silica sol having a mean particle diameter of 10 to 80 nm has a pH of 2 to 6. Although the pH may be less than 2, the amount of unnecessary anion increases and thus, such pH is not preferable. If the pH exceeds 6, non-uniform coagulation of the colloidal silica particles will occur in the step (b), so that such pH is not preferable. Since the silanol groups on the surface of colloidal silica particle in the acidic spherical silica sol having a mean particle diameter of 10 to 80 nm can inhibit adsorption of excessive II or III valent metal ions in the liquid in the step (a) by absorption of a small amount of $Na^+$ thereon, a pH of 3 to 5.5 is particularly preferable. The acidic spherical silica sol is preferably those that contain a smaller amount of electrolytes (cations and anions), that is, those having lower electroconductivity is preferred.

In the step (b), when the acidic spherical silica sol having a mean particle diameter of 10 to 80 nm is added to the mixed liquid (a) obtained by the step (a), uniform mixing can be achieved. This uniform mixing is so important that the colloid of active silicic acid or a colloidal silica particle having a mean particle diameter of 3 to 8 nm which are adsorbed thereon with the II or III valent metal ions as obtained by the step (a) are to be easily adsorbed on the surface of the colloidal silica particles having a mean particle diameter of 10 to 80 nm.

The acidic spherical silica sol having a mean particle diameter of 10 to 80 nm can be added in an $SiO_2$ concentration of 10 to 50% by weight. Although it is possible to use the sol in a concentration of less than 10% by weight, it is not efficient since the removal of a large amount of water is required when concentration is conducted after the step (d). Further, $SiO_2$ concentration may exceed 50% by weight but it is difficult to obtain acidic silica sol having a mean particle diameter of 10 to 80 nm in excess of 50% by weight and thus, such concentration is not preferable.

When the amount of silica content (A) derived from the acidic spherical silica sol having a mean particle diameter of 10 to 80 nm added in the step (b) to the silica content (B) derived form the mixed liquid (a) obtained by the step (a), of less than 5 in terms of A/B weight ratio, it is not preferable since the finally produced colloidal silica particles will have a three-dimensional gel structure. If this weight ratio exceeds 100, the above-mentioned $D_1/D_2$ ratio will be less than 3 and hence, it is not preferable.

When the total silica content (A+B) in the mixed liquid (b) obtained by the step (b) is less than 5% by weight as an $SiO_2$ concentration, it is not preferable since it is difficult to obtain the intended moniliform colloidal silica particles while the content of more than 40% by weight is not preferable either since the finally produced colloidal silica particles will have a three-dimensional gel structure.

If the mixed liquid (a) obtained by the step (a) is left to stand for a long time, the coagulation of colloidal silica particles in the liquid proceeds, so that the acidic spherical silica sol having a mean particle diameter of 10 to 80 nm obtained by the step (b) is to be added as soon as possible.

The mixed liquid (b) obtained by the step (b) is more stable than the mixed liquid (a) obtained by the step (a). However, after left to stand for a long time, the coagulation of the colloidal silica particles in the liquid also proceeds, so that the alkali metal hydroxide, water-soluble organic salt or water-soluble silicate by the step (c) is added as soon as possible. These alkaline substances are added, with stirring, directly or as an aqueous solution of from about 1 to about 20% by weight in order to make homogeneous mixing.

In the step (c), the amount of the above alkaline substance to be added is such an amount that the pH of the mixed liquid (c) obtained by the step (c) becomes 7 to 11. At a pH of less than 7, the connection between the spherical colloidal silica particles and the silica bonding them in the step (d) is insufficient so that such a pH is not preferable. If the pH exceeds 11, the colloidal silica particles tend to be dissolved in the step (d), so that such pH value is not preferable. Although the pH of the mixed liquid (c) obtained by the step (c) and the $SiO_2/M_2O$ (where M represents an alkali metal atom or an organic base and O represents an oxygen atom) molar ratio of silica and an alkaline substance in the liquid are associated, the molar ratio will change by the amount of the acid in the liquid and thus, control by pH is preferable. Expressing in terms of $SiO_2/M_2O$ molar ratio, the addition amount of the alkaline substance to be added corresponds to an $SiO_2/M_2O$ molar ratio of 50 to 800.

If the heating temperature in the step (d) is less than 100° C., the connection between the spherical colloidal silica particles and the metal oxide-containing silica bonding them to silica occurs insufficiently and accordingly, the intended colloidal silica particles having 3 or more in terms of the above-mentioned $D_1/D_2$ ratio cannot be obtained so that such is not preferable. Further, in excess of 200° C., since the spherical colloidal silica particles connect to each other to form larger particles, the intended colloidal silica particles cannot be obtained and thus, such temperature is not preferable.

If the heating time in the step (d) is less than 0.5 hour, the connection between the spherical colloidal silica particles and the metal oxide-containing silica bonding them occurs insufficiently and the target colloidal silica cannot be obtained so that such is not preferable. Although it may exceed 50 hours, the production time is too long to be efficient.

After the completion of the step (d), the obtained sol is cooled. The silica sol may be diluted with water if desired.

Stability is an indispensable property to the silica sol as an industrial product and a concentration of usually 10 to 50% by weight as $SiO_2$ is desired. To obtain stable alkaline silica sol in this concentration, it is necessary to adjust the concentration of anion which may be present in the silica sol and the amount of alkali cation must be adjusted and it is required to adjust a pH of the product to 8 to 11.

When microfine porous membrane for removing anions from the silica sol obtained by the step (d) is used the removal of cations is caused together so that there may be a case that the alkali cations remaining in the silica sol may be deficient. In such a case, a stable silica sol can be obtained by performing the concentration while supplementing to silica sol the alkali metal hydroxide, organic salt or the like in an amount necessary for the stabilization of silica sol or supplementing it after the concentration. In a method in which a microfine porous membrane such as ultrafiltration membrane is used, since the colloidal silica particles in the silica sol will not pass the membrane, the silica sol is simultaneously concentrated as water flows out together with the anions. The concentrated silica sol can be optionally diluted with water.

The II or III valent metal ions added by the step (a) connect with silica by the step (d) and are present either in the silica of the connected portion or a part of them are present as connected with the colloidal silica particles or strongly adsorbed thereon. Although the II or III valent metal ions present on the surface do not significantly hinder the stability of the silica sol, they may cause some problems when the obtained silica sol as a product is used.

The II or III valent metal ions present on the surface of colloidal silica particles can be sequestered adding, under heating, water glass or an active silicic acid-containing aqueous colloid liquid to the obtained silica sol after the step (d). Also, the adsorbed metal ions can be removed by subjecting the obtained silica sol to cation exchange treatment.

Next, the second embodiment of the present invention will be described in detail.

The silica sol used in the second embodiment of the present invention, containing water dispersed moniliform colloidal silica particles each having 3 or more as a ratio of $D_1/D_2$ of a particle diameter ($D_1$ nm) measured by a dynamic light scattering method to a mean particle diameter (a particle diameter measured by a nitrogen adsorption method: $D_2$ nm) where $D_1$ is 50 to 500nm, and which are composed of spherical colloidal silica particles having a mean particle diameter of 10 to 50 nm and metal oxide-containing silica bonding these spherical colloidal silica particles, and in which the spherical colloidal silica particles link in rows in only one plane (hereinafter, referred to as moniliform silica sol) can be produced by the following process comprising the steps (a) to (d):

(a) adding an aqueous solution containing a water-soluble II valent metal salt or a water-soluble III valent metal salt singly or in admixture to an active silicic acid-containing aqueous colloid liquid having a pH of 2 to 6 or an acidic silica sol having a mean particle diameter of 3 to 8 nm, each containing 0.5 to 10% by weight as $SiO_2$, in an amount of 1 to 10% by weight as a metal oxide (MO in the case of the II valent metal salt and $M_2O_3$ in the case of the III valent metal salt, provided that M represents a II valent or III valent metal atom and O represents an oxygen atom) based on $SiO_2$ in the aqueous colloidal solution of active silicic acid or acidic silica sol and mixing them, (b) adding acidic spherical silica sol having a mean particle diameter of 10 to 50 nm and a pH 2 to 6 to the mixed liquid (a) obtained in the step (a) in such an amount that a ratio of a silica content (A) derived from the acidic spherical silica sol to a silica content (B) derived from the mixed liquid (a), A/B (weight ratio) is 5 to 100 and that total silica content (A+B) of a mixed liquid (b) obtained by mixing the acidic spherical silica sol with the mixed liquid (a) is an $SiO_2$ concentration of 5 to 40% by weight in the mixed liquid (b) and mixing them, (c) adding an alkali metal hydroxide, water-soluble organic base or water-soluble silicate to the mixed liquid (b) obtained in the step (b) such that pH becomes 7 to 11 and mixing them, and (d) heating the mixed liquid (c) obtained in the step (c) at 100 to 200° C. for 0.5 to 50 hours.

The silica sol obtained by the above process is an alkaline aqueous silica sol of sodium hydroxide-stabilized type. Cation exchange treatment of this silica sol can give rise to an acidic aqueous silica sol. Addition of other alkalis to the silica sol can give rise to alkaline aqueous silica sols other than the above such as those of ammonia-stabilized type. The acidic silica sol preferably is the one having a pH of 2 to 4. An aqueous silica sol comprised of positively charged colloidal silica particle can be obtained from the alkaline aqueous silica sol or acidic aqueous silica sol by an ordinary method.

In the second embodiment of the present invention, the above-described alkaline moniliform silica sol, acidic moniliform silica sol, and positively charged moniliform silica sol can be used. Further, they can be used by adding necessary amounts of inorganic acids such as hydrochloric acid and formic acid or organic acid aqueous solutions to the alkaline silica sol before use to make the liquid neutral or acidic.

In the second embodiment of the present invention, the moniliform silica sol having an $SiO_2$ concentration of 5 to 50% by weight and a pH of 2 to 11 can be used.

The moniliform silica sol used in the second embodiment of the present invention has a feature that upon drying the colloidal silica linked in rows in a moniliform shape coagulate to forming a gel having large spaces. The mean pore diameter measured by a mercury porosimeter is 20 to 80 nm and cumulative pore volume is a surprisingly high value of 0.7 to 2.0 cc/g. In other words, although the moniliform silica sol used in the second embodiment of the present invention is sol, it has a cumulative pore volume comparable to that of silica powder and also has a relatively high viscosity and good fluidity. The moniliform silica sol has also excellent film-forming property and hence, by use of a small amount of binder, it can give rise to a coating film having no crack and a film which is large in thickness. Furthermore, the moniliform silica sol used in the second embodiment of the present invention, unlike the precipitated silica powder and gas phase silica powder, has a property that the colloidal silica particles linked in rows in a moniliform shape connect to each other upon drying, so that a stronger coating film can be obtained with a smaller amount of binder.

From the above, the coating composition for ink receiving layer of the second embodiment of the present invention exhibits viscosity and fluidity suitable for coating and therefore, upon coating and drying, an ink receiving layer that is smooth and substantially free of cracks and has a good luster can be obtained.

The obtained ink receiving layer has good antistatic effect due to the presence of silanol groups on the surface of the colloidal silica particles contained therein.

The aqueous resin used in the second embodiment of the present invention includes natural polymers, water-soluble resins, resin emulsions and the like. The natural polymer includes casein, soybean protein, starch, gelatin and the like. Examples of the water-soluble resin include those resins having a hydroxyl group as a hydrophilic structure unit, such as polyvinyl alcohol (PVA), cellulose base resins (methylcellulose (MC), ethylcellulose (EC), hydroxyethylcellulose (HEC), carboxymethylcellulose (CMC) and the like), chitins and starch, those resins having an ether bond as a hydrophilic structure, such as polyethylene oxide (PEO), polypropylene oxide (PPO), polyethylene glycol (PEG) and polyvinyl ether (PVE), and those resins having an amido group or an amido bond as a hydrophilic structure unit, such as polyacrylamide (PAAM) and polyvinylpyrrolidone (PVP). The resin emulsion includes conjugated diene copolymer emulsions such as styrene-butadiene copolymer emulsion and methyl methacrylate-butadiene copolymer emulsion, and acrylic polymer emulsions, vinyl polymer emulsions such as ethylene-vinyl acetate polymer, ester polymer emulsions, urethane polymer emulsions, olefin polymer emulsions, epoxypolymer emulsions, vinylidene chloride emulsions and the like. Conventionally known binders used for coating paper or film may be used singly or two or more of them may be used in combination.

When the above-mentioned moniliform silica sol has a cationic property, cation-modified water-soluble resin and cationic resin emulsions may be used as necessary. Amorphous alumina sol or alumina sol having boehmite structure may be used in combination therewith.

The coating composition for ink receiving layers of the second embodiment of the present invention can be obtained basically by a method of mixing a moniliform silica sol and an aqueous resin solution. In a case of resin emulsions, a moniliform silica sol may also be added to monomers for polymerization at the time of producing resin emulsions.

In the second embodiment of the present invention, the mixing ratio of the colloidal silica particles linked in rows in a moniliform shape and aqueous resin is preferably 100/5 to 100/100, especially, 100/10 to 100/50 as a weight ratio of colloidal silica particle/aqueous resin.

When the weight ratio exceeds 100/5, it is not preferable since an obtained receiving layer suffers severe crack generation or uneven infiltration of ink. On the other hand, when the weight ratio is less than 100/100, the resin is major, which makes the amount of ink absorption and absorption rate smaller, so that such weight ratio is not preferable.

In the second embodiment of the present invention, the total amount of the colloidal silica particles, linked in rows in a moniliform shape and the aqueous resin in the coating composition for ink receiving layers is preferably 5 to 40% by weight. If it is less than 5% by weight, no receiving layer having sufficient film thickness can be obtained while when it exceeds 40% by weight, the viscosity of the coating composition is too high or dries too fast and therefore, such weights are not preferable. 10 to 30% by weight is particularly preferable.

In the coating composition for ink receiving layers of the second embodiment of the present invention, besides the colloidal silica linked in rows in a moniliform shape, it is possible to use singly or in combination of various pigments publicly known and used in the field of general coated paper production, for example, kaolin, clay, calcined clay, general amorphous silica having large particle, general synthetic amorphous silica havinglarge particle, zinc oxide, aluminum oxide, aluminum hydroxide, calcium carbonate, satin white, aluminum silicate, alumina, colloidal silica particles, zeolite, synthetic zeolite,: sepiolite, smectites, synthetic smectites, magnesium silicate, magnesium carbonate, magnesium oxide, diatomaceous earth, styrene plastic pigment, hydrotalcite, urea resin plastic pigment, benzoguanamine plastic pigment.

The solvent in the coating composition for ink receiving layers of the second embodiment of the present invention is generally water. If necessary, a small amount of water-soluble organic solvent such as alcohols, glycols and the like can be used.

The coating composition for ink receiving layers of the second embodiment of the present invention comprising the colloidal silica particles linked in rows in a moniliform shape and the aqueous resin. In addition thereto, it may contain various inorganic salts for increasing dispersibility of particles and may contain acids or alkalis as a pH adjusting agent. For the purpose of increasing coatability or surface quality, various surfactants may be used. To suppress triboelectric charging or peeling charging on the surface or to adjust surface electrical resistance in electrophotography, it may contain surfactants having ion conductivity or metal oxide fine particles having electroconductivity. Also, for the purpose of fixing the pigment in ink recording to increase water resistance, a mordant may be used. For the purpose of decreasing the friction property of the surface, it may contain matting agent. For the purpose of preventing the deterioration of coloring material, it may contain various antioxidants and ultraviolet absorbents.

The paper substrate on which the coating composition for ink receiving layer of the second embodiment of the present invention is coated is not particularly limited and acid paper, neutral paper or the like used in general coated paper is preferably used. Also, sheets having porosity and air permeability may be deemed as paper substrate.

The plastic films/sheets on which the coating composition for ink receiving layers of the second embodiment of the present invention is coated include, for example, plastic films/sheets having very high transparency such as cellophane, polyethylene, polypropylene, flexible polyvinyl chloride, hard polyvinyl chloride, and polyester (PET and the like) and films/sheets having low transparency such as white PET and synthetic paper. As the above substrate, a laminate of paper and plastic film/sheet may be used.

The coating composition for ink receiving layers of the second embodiment of the present invention may be coated on the above paper substrate or plastic films/sheets using various known coaters such as a blade coater, an air knife coater, a roll coater, a bar coater, a gravure coater, a rod blade coater, a die coater, a lip coater, and a curtain coater. After the coating, it is dried at 60 to 180° C. by means of a hot-air drier or the like to thereby form an ink receiving layer. Further, after the coating and drying, the ink receiving layer may be passed through between roll nips in, for example, super calender, gloss calender or the like under heating and compression so that surface smoothness, transparency and film strength can be increased.

The ink receiving layer obtained by coating the coating composition for ink receiving layers of the second embodiment of the present invention on paper or film or sheet and drying it has a film thickness in the range of preferably 10 to 50 μm.

If the film thickness is less than 10 μm, the absorbability and absorption speed of ink decrease and therefore, such thickness is not preferable. On the other hand, if it exceeds 50 μm, the amount of the coating composition for ink receiving layer to be used is too large, which makes the coating difficult or cracks tend to occur and thus, such thickness is not preferable.

BEST MODE FOR CARRYING OUT THE INVENTION

Figure 1:
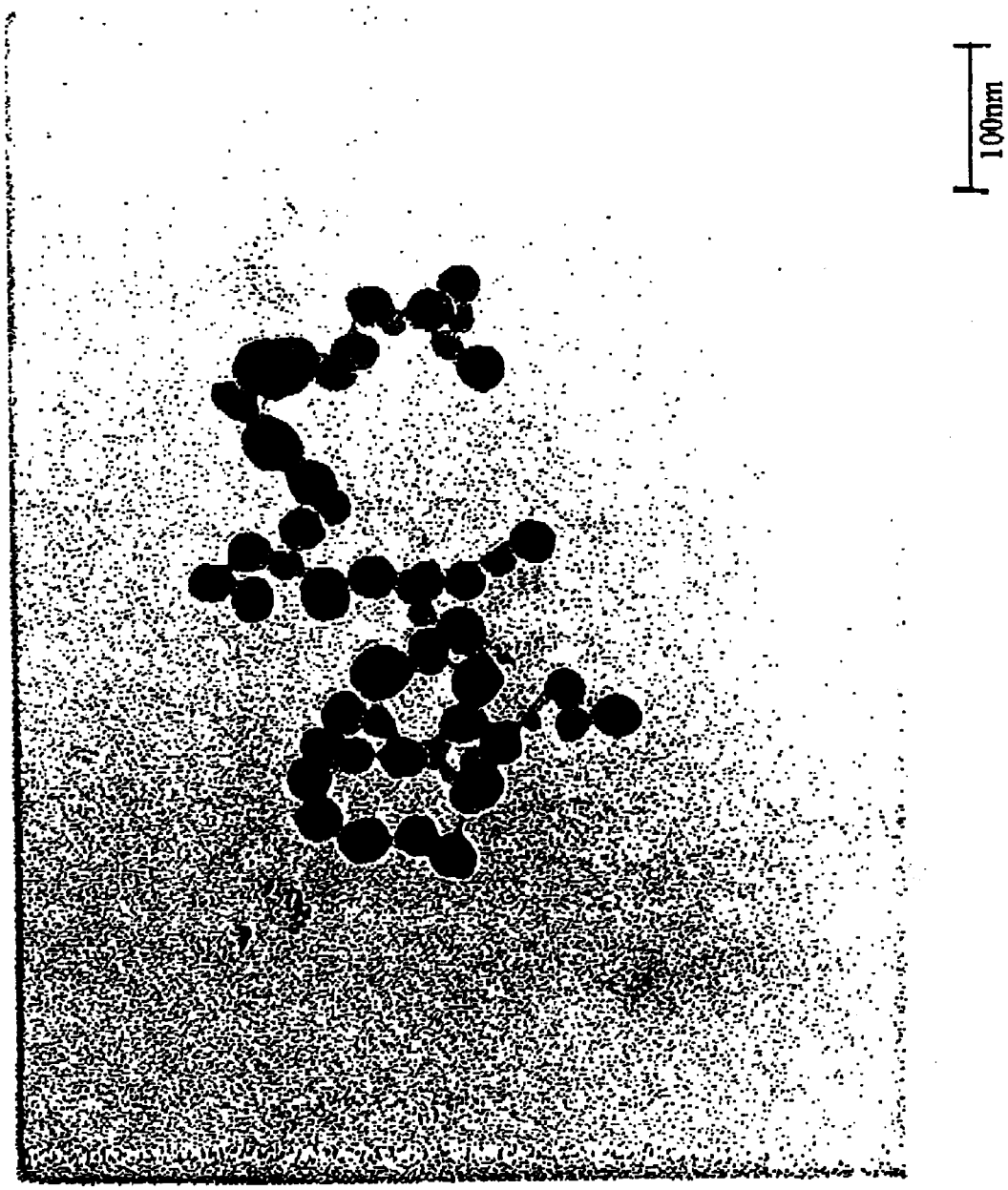
FIG. 1 is a photograph of the moniliform colloidal silica particles of the silica sol obtained in Example 1, taken using an electron microscope.

Hereinafter, examples and comparative examples relating to the moniliform silica sol and its production process according to the first embodiment of the present invention are shown.

EXAMPLE 1

Pure water was added to commercially available JIS No. 3 water glass ($SiO_2/Na_2O$ molar ratio: 3.22, $SiO_2$ concentration: 28.5% by weight) to obtain an aqueous sodium silicate solution having an $SiO_2$ concentration of 3.6% by weight. The aqueous sodium silicate solution was passed through a column filled with a cationic exchange resin, trade name: Amberlite 120B, separately provided to obtain an active silicic acid-containing aqueous colloid liquid having an $SiO_2$ concentration of 3.60% by weight, a pH of 2.90 and an electroconductivity of 580 $\mu S/cm$.

888 g of the active silicic acid-containing aqueous colloid liquid ($SiO_2$ content: 32.0 g) was put in a glass container and 600 g of pure water was added thereto with stirring to give an active silicic acid-containing aqueous colloid liquid having an $SiO_2$ concentration of 2.15% by weight and a pH of 3.07. Then, 59 g (CaO content: 2.02 g) of an aqueous 10 wt. % calcium nitrate solution (pH 4.32) was added thereto with stirring at room temperature and the stirring was continued for 30 minutes. The calcium nitrate added was 6.30% by weight as CaO based on $SiO_2$.

On the other hand, 2,000 g ($SiO_2$ content: 802 g) of SNOWTEX O-40 (manufactured by Nissan Chemical Industries, Ltd.) (specific gravity: 1.289, viscosity: 4.10 mPa·s, pH 2.67, electroconductivity: 942 $\mu S/cm$, $SiO_2$ concentration: 40.1% by weight) as an acidic spherical silica sol having a mean particle diameter (nitrogen adsorption method/$D_2$) of 20.5 nm was put in a separate glass container, to which was added 6.0 g of aqueous 5 wt. % sodium hydroxide solution with stirring and the stirring was continued for additional 30 minutes to obtain an acidic silica sol having a pH of 4.73 and SiO2 concentration of 40.0% by weight.

The particle diameter (PD) of the silica sol measured by the dynamic light scattering method is 35.0 nm and the $D_1/D_2$ value was 1.71. Further, electromicroscopic observation revealed that the colloidal silica particles in the silica sol were spherical and showed dispersion close to monodisperse and no connection between the colloid particles nor coagulation was observed.

To the active silicic acid-containing aqueous colloid solution to which the calcium nitrate was added [mixed liquid (a)] was added the acidic spherical silica sol having a mean diameter of 20.5 nm with stirring and the stirring was continued for 30 minutes.

The obtained mixed liquid (b) had 25.1 as a ratio of A/B (weight ratio) of the silica content (A) derived from the acidic spherical silica sol to the silica content (B) derived from the active silicic acid-containing aqueous colloid liquid [mixed liquid (a)], a pH of 3.60 and an electroconductivity of 2,580 $\mu S/cm$, and the total silica content (A+B) in the mixed liquid (b) was 23.5% by weight as $SiO_2$ concentration. The calcium ion in the liquid was 0.242% by weight as CaO based on $SiO_2$.

Next, to the obtained mixed liquid (b) was added 330 g of aqueous 1.97 wt. % sodium hydroxide solution over 10 minutes with stirring and the stirring was further continued for 1 hour. A mixed liquid (c) obtained by the addition of the aqueous sodium hydroxide solution had a pH of 9.22, an electroconductivity of 3,266 $\mu S/cm$, an $SiO_2$ concentration of 21.5% by weight and an $SiO_2/Na_2O$ molar ratio of 163.5. In the mixed liquid (c), a small amount of silica gel was observed.

Next, 1,800 g of the alkaline mixed liquid (c) was charged in a stainless steel autoclave and heated at 145° C. for 3 hours with stirring. After cooling, 1,800 g of the content was taken out. The obtained liquid was a silica sol of transparent colloid color [moniliform silica sol A] containing $SiO_2$ concentration of 21.5% by weight and having an $SiO_2/Na_2O$ molar ratio of 200, a pH of 9.62, a specific gravity of 1.141, a viscosity of 91.7mPa·s, an electroconductivity of 3,290 $\mu S/cm$, percent transmission of 59.0%, and a particle diameter measured by the dynamic light scattering method ($D_1$) of 177 nm.

Therefore, the $D_1/D_2$ ratio was 8.63. According to electromicroscopic observation, the colloidal silica particles in the obtained silica sol were moniliform colloidal silica particles that were comprised by spherical colloidal silica particles and silica bonding them to each other, in which the spherical colloidal silica particles were linked in rows in one.plane in a number of 5 to 30. No three-dimensional gel structure particle was observed. Dried product of the sol had a cumulative pore volume of 1.23 cc/g measured using a mercury porosimeter and mean pore diameter of 49 nm.

FIG. 1 is a photograph of moniliform colloidal silica particles in the thus-obtained silica sol taken using an electronic microscope.

The silica sol was coated on a glass plate using an applicator for coating 0.001 inch (25 $\mu$m) film and dried. As a result, a film having no crack was obtained.

In the silica sol, existence of silica gel was not observed and it was observed that the silica sol generated no precipitation nor gelling occurred after it was left to stand at room temperature for 6 months, and was stable.

To 800 g ($SiO_2$ content: 172 g) of the obtained alkaline silica sol were added 1,600 g of water and 13 g of aqueous 5 wt. % sodium hydroxide solution to give a silica sol having an $SiO_2$ concentration of 7.13% by weight, a.pH of 10.52 and an electroconductivity of 1,530 $\mu S/cm$ and then, desalting and concentration were conducted at room temperature by means of an ultra filter for a fractionation molecular weight of 50,000 of flat membrane type ultrafiltration apparatus to obtain 662 g of silica sol.

The concentrated silica sol had a specific gravity of 1.177, a pH of 10.0, a viscosity of 270 mPa·s, an electroconductivity of 2,160 $\mu S/cm$, an $SiO_2$ concentration of 26.0% by weight, and a particle diameter of 177 nm measured by the dynamic light scattering method. Therefore, the $D_1/D_2$ value was 8.63 nm and no change due to desalting or concentration was observed.

To 400 g ($SiO_2$ content: 104 g) of the desalted alkaline silica sol was added 72 g of water to give a silica sol of an $SiO_2$ concentration of 22% by weight, which was then passed through a column filled with cationic exchange resin, Amberlite 120B to obtain an acidic silica sol.

The acidic silica sol had a specific gravity of 1.143, a pH of 2.50, a viscosity of 25 mPa·s, an electroconductivity of 1,930 $\mu S/cm$, and a particle diameter ($D_1$) of 175 nm measured by the dynamic light scattering method. Therefore, the colloidal silica particles in the acidic silica sol had a $D_1/D_2$ ratio of 8.54 and it was confirmed that the moniliform linking in rows underwent no change by rendering acidic. By electromicroscopic observation, no difference was observed from the colloidal silica in the alkaline sol. The acidic silica sol was stable, generating no precipitation and undergoing no gelling after it was left to stand at room temperature for 6 months or more.

EXAMPLE 2

1,800 g of the alkaline mixed liquid (c) obtained in Example 1 was charged in a stainless steel autoclave and heated at 135° C. for 3 hours with stirring. After cooling, 1,800 g of the content was taken out. The obtained liquid was a silica sol of transparent colloid color [moniliform silica sol B] containing $SiO_2$ concentration of 21.5% by weight, a pH of 9.56, a specific gravity of 1.141, a viscosity of 4.5 mPa·s, an electroconductivity of 3,285 $\mu$S/cm, and a particle diameter measured by the dynamic light scattering method ($D_1$) of 116 nm. Therefore, the $D_1/D_2$ ratio was 5.66. According to electromicroscopic observation, the colloidal silica particles in the obtained silica sol were moniliform colloidal silica particles that were comprised by spherical colloidal silica particles and silica bonding them to each other, in which the spherical colloidal silica particles were linked in rows in one plane in a number of 4 to 20. No three-dimensional gel structure particle was observed. Dried product of the sol had a cumulative pore volume of 1.12 cc/g measured using a mercury porosimeter and a mean pore diameter of 40 nm.

In the silica sol, existence of silica gel was not observed and it was observed that the silica sol generated no precipitation nor gelling occurred after it was left to stand at room temperature for 6 months, and was stable.

800 g ($SiO_2$ content: 172 g) of the above alkaline silica sol was concentrated under reduced pressure to 429 g using a rotary evaporator. The obtained high concentration alkaline silica sol had a specific gravity of 1.300, a pH of 9.18, a viscosity of 407 mPa·s, a percent transmission of 80.0%, an electroconductivity of 6,420 $\mu$S/cm, and an $SiO_2$ concentration of 40.1% by weight. In the silica sol, existence of silica gel was not observed and it was observed that the silica sol generated no precipitation nor gelling occurred after it was left to stand at room temperature for 6 months, and was stable.

1,000 g of the obtained alkaline silica sol ($SiO_2$ content: 215 g) was passed through a column filled with Amberlite 410, an anion exchange resin, and then through a column filled with Amberlite 120B, a cation exchange resin to obtain 1,400 g of an acidic silica sol. The silica sol had an $SiO_2$ concentration of 15.4% by weight, a pH of 3.20, an electroconductivity of 340 $\mu$S/cm, and a viscosity of 3.5 mPa·s. Further, the silica sol was concentrated under reduced pressure using a rotary evaporator to obtain 717 g of an acidic silica sol having an $SiO_2$ concentration of 30.0% by weight [moniliform silica sol C]. The acidic silica sol had a specific gravity of 1.206, a pH of 3.04, a viscosity of 64 mPa·s, an electroconductivity of 645 $\mu$S/cm, and a particle diameter measured by the dynamic light scattering method ($D_1$) was 116 nm. Therefore, the colloidal silica particles in the acidic silica sol had a $D_1/D_2$ ratio of 5.66 and it was confirmed that rendering acidic did not change the linking in rows in a moniliform shape. By electromicroscopic observation, no difference was observed from the colloidal silica particle in the alkaline sol. The acidic silica sol had high viscosity since the anions were removed but was stable, generating no precipitation and undergoing no gelling after it was left to stand at room temperature for 6 months or more. 650 g ($SiO_2$ content: 195 g) of the acidic silica sol having an $SiO_2$ concentration of 30.0% by weight [moniliform silica sol C] was put in a glass container, to which was added 42.4 g ($Al_2O_3$ content: 9.75 g) of an aqueous basic aluminum chloride ($Al_2(OH)_5Cl$) solution (trade name: Takibain #1500, $Al_2O_3$ concentration: 23.0% by weight, Cl: 8.09% by weight, manufactured by Taki Chemical Co., Ltd.) with stirring and the stirring was continued for 30 minutes. Next, 20.6 g of an aqueous 5 wt. % sodium hydroxide solution was added thereto intermittently over 30 minutes with stirring and the stirring was continued for 1 hour to obtain 713 g of a positively charged moniliform silica sol having an $SiO_2$ concentration of 27.3% by weight and a pH of 4.98.

Next, the silica sol was concentrated under reduced pressure by a rotary evaporator to obtain 487 g of a positively charged moniliform silica sol having an $SiO_2$ concentration of 40.0% by weight [moniliform silica sol D]. The positively charged moniliform silica sol had a specific gravity of 1.303, a pH of 4.36, a viscosity of 395 mPa·s, an electroconductivity of 13.2 $\mu$S/cm, an $SiO_2$ concentration of 40.0% by weight, an $Al_2O_3$ concentration of 2.0% by weight, and a particle diameter measured by the dynamic light scattering method ($D_1$) of 120 nm.

EXAMPLE 3

In a glass container was put 151 g ($SiO_2$ content: 16.0 g) of acidic silica sol SNOWTEX OXS having a mean particle diameter (Shears method/$D_3$) of 5.6 nm (manufactured by Nissan Chemical Industries, Ltd.) (specific gravity: 1.062., viscosity: 1.2 mPa·s, pH 2.90, electroconductivity: 370 $\mu$S/cm, $SiO_2$ concentration: 10.6% by weight), to which was added 593 g of pure water with stirring to give an acidic silica sol having an $SiO_2$ concentration of 2.15% by weight and a pH 3.42. The silica sol had a particle diameter measured by the dynamic light scattering method ($D_1$) of 14.4 nm and a $D_1/D_3$ value of 2.57. Then, 31 g (CaO content: 1.06 g) of an aqueous 10% by weight calcium nitrate solution (pH 4.32) was added to the acidic silica sol with stirring at room temperature and the stirring was continued for 30 minutes. The calcium nitrate added was 6.63% by weight as CaO based on $SiO_2$.

On the other hand, 1,000 g ($SiO_2$ content: 401 g) of SNOWTEX O-40 the acidic spherical silica sol having a mean particle diameter ($D_2$) of 20.5 nm which was used in Example 1 was put in a separate glass container, to which was added 3.0 g of aqueous 5 wt. % sodium hydroxide solution with stirring and the stirring was continued for 30 minutes to obtain an acidic silica sol having a pH of 4.73, and $SiO_2$ concentration of 40.0% by weight.

The acidic silica sol having a mean particle diameter of 20.5 nm was added to the acidic silica sol containing calcium nitrate having a mean particle diameter of 5.0 nm with stirring and the stirring was continued for 30 minutes. The obtained mixed liquid had a ratio of A/B (weight ratio) 25.1 of the silica content (A) derived from the acidic spherical silica sol having a mean particle diameter of 20.5 nm to the silica content (B) derived from the acidic silica sol [mixed liquid (a)] having a mean particle diameter of 5.0 nm, a pH of 4.07 and an electroconductivity of 3,050 $\mu$S/cm, and the total silica content (A+B) in the mixed liquid (b) was 23.5% by weight as $SiO_2$ concentration. The calcium ion in the liquid was 0.254% by weight as CaO based on $SiO_2$.

Next, 65 g of an aqueous 5.0 wt. % sodium hydroxide solution was added to the obtained mixed liquid (b) over 5 minutes with stirring and the stirring was continued for 1 hour. The mixed liquid (c) obtained by the addition of the aqueous sodium hydroxide solution had a pH of 9.42, an electroconductivity of 3,820 μS/cm, an $SiO_2$ concentration of 22.6% by weight and an $SiO_2/Na_2O$ molar ratio of 163.5. In the mixed liquid (c), no silica gel was observed.

Next, 1,800 g of the alkaline mixed liquid (c) was put in a stainless steel autoclave and heated at 140° C. for 3 hours with stirring. After cooling, 1,800 g of the content was taken out. The obtained liquid was a silica sol of transparent colloid color though it contained a minute amount of silica gel. It contained $SiO_2$ concentration of 22.6% by weight and had a pH of 9.57, a specific gravity of 1.148, a viscosity of 800 mPa·s, an electroconductivity of 3,850 μS/cm, a percent transmission of 56.9%, and a particle diameter measured by the dynamic light scattering method ($D_1$) of 194 nm. Therefore, the $D_1/D_2$ ratio was 9.46.

According to electromicroscopic observation, the colloidal silica particles in the obtained silica sol were moniliform colloidal silica particles that were comprised by spherical colloidal silica particles and silica bonding them to each other, in which the spherical colloidal silica particles were linked in rows in one plane in moniliform shape in a number of 5 to 30. No three-dimensional gel structure particle was observed.

In the silica sol, existence of silica gel was not observed and it was observed that the silica sol generated no precipitation nor gelling occurred after it was left to stand at room temperature for 6 months, and it was stable.

EXAMPLE 4

The active silicic acid-containing aqueous colloid liquid having an $SiO_2$ concentration of 3.60% by weight, a pH of 2.91, and an electroconductivity of 580 μS/cm described in Example 1 was obtained.

532 g ($SiO_2$ content: 19.2 g) of the active silicic acid-containing aqueous colloid liquid was put in a glass container and 200 g of pure water was added thereto with stirring to give an active silicic acid-containing aqueous colloid liquid of having an $SiO_2$ concentration of 2.62% by weight and a pH of 3.02. Next, 35.4 g (CaO content 1.21 g) of an aqueous 10 wt. % calcium nitrate solution (pH 4.32) was added thereto at room temperature under stirring and the stirring was continued for 30 minutes. The calcium nitrate added was 6.32% by weight as CaO based on $SiO_2$.

1,600 g ($SiO_2$ content: 800 g) of an acidic spherical silica sol having a mean particle diameter ($D_2$) of 37.0 nm, SNOWTEX OML (manufactured by Nissan Chemical Industries, Ltd.) (specific gravity: 1.404, viscosity: 12.7 mPa·s, pH 2.15, electro-conductivity: 2,405 μS/cm, $SiO_2$ concentration: 50.0% by weight) was put in a separate glass container, to which was added 9.0 g of an aqueous 5% by weight sodium hydroxide solution under stirring and the stirring was continued for additional 30 minutes to obtain an acidic silica sol having a pH of 5.04, and $SiO_2$ concentration of 49.7% by weight. The particle diameter ($D_1$) of SNOWTEX OML measured by the dynamic light scattering method was 54.4 nm and the $D_1/D_2$ value was 1.47. Further, electromicroscopic observation revealed that the colloidal silica particles in the silica sol were spherical and showed dispersion close to monodisperse and no connection between the colloid particles nor aggregation was observed. To the active silicic acid-containing aqueous colloid liquid to which the calcium nitrate was added [mixed liquid (a)] was added the acidic spherical silica sol having a mean diameter of 37.0 nm with stirring and the stirring was continued for 30 minutes.

The obtained mixed liquid (b) had a ratio of A/B (weight ratio) 42.1 of the silica content (A) derived from the acidic spherical silica sol to the silica content (B) derived from the active silicic acid-containing aqueous colloid solution of [mixed liquid (a)] a pH of 4.03 and an electroconductivity of 2,900 μS/cm, and the total silica content (A+B) in the mixed liquid was 34.6% by weight as $SiO_2$ concentration. The calcium ion in the liquid was 0.148% by weight as CaO based on $SiO_2$.

Next, to the obtained mixed liquid (b) was added 40 g of an aqueous 10 wt. % sodium hydroxide solution over 5 minutes with stirring and the stirring was continued for 1 hour. The mixed liquid obtained by the addition of the aqueous sodium hydroxide solution had a pH of 9.24, an electroconductivity of 3,920 μS/cm, an $SiO_2$ concentration of 34.0% by weight and an $SiO_2/Na_2O$ molar ratio of 245. In the mixed liquid (c), a small amount of silica gel was observed.

Next, 1,800 g of the alkaline mixed liquid (c) was put in a stainless steel autoclave and heated at 150° C. for 3 hours with stirring. After cooling, 1,800 g of the content was taken out. The obtained liquid was a silica sol that contained no silica gel and had a relatively intense colloid color. It had an $SiO_2$ concentration of 34.0% by weight and had a pH of 9.54, a specific gravity of 1.240, a viscosity of 42.9 mPa·s, an electroconductivity of 3,685 μS/cm, a percent transmission of 24.1%, and a particle diameter measured by the dynamic light scattering method ($D_1$) of 155 nm. Therefore, the $D_1/D_2$ ratio was 4.19. According to electromicroscopic observation, the colloidal silica particles in the obtained silica sol were moniliform colloidal silica particles that were comprised by spherical colloidal silica particles and silica bonding them to each other, in which the spherical colloidal silica particles were linked in rows in one plane in moniliform shape in a number of 2 to 20. No three-dimensional gel structure particle was observed. Dried product of the sol had a cumulative pore volume of 1.18 cc/g measured using a mercury porosimeter and a mean pore diameter of 76 nm.

Figure 2:
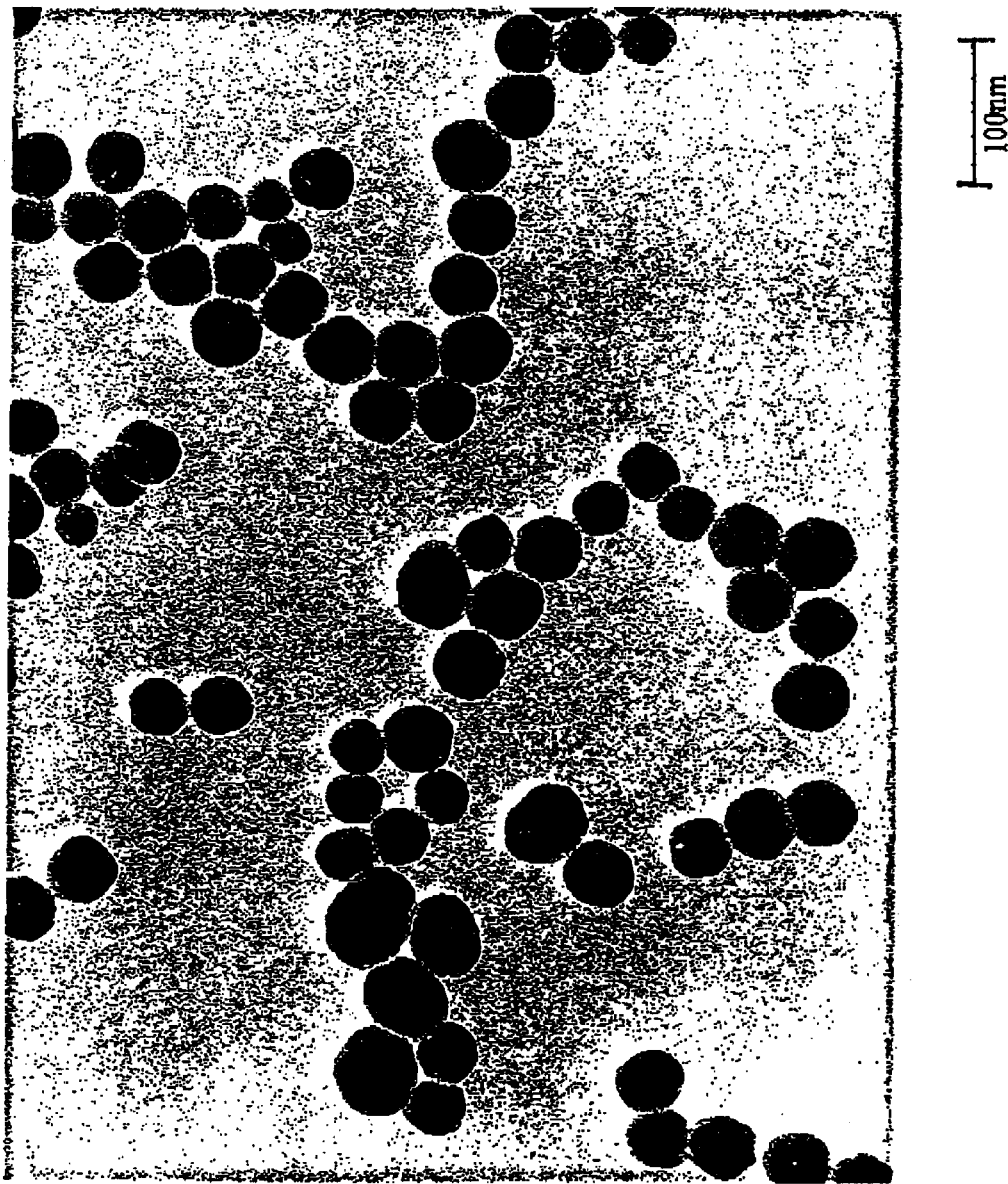
FIG. 2 is a photograph of the moniliform colloidal silica particles of the silica sol obtained in Example 4, taken using an electron microscope.

FIG. 2 is a photograph of moniliform colloidal silica particles in the thus-obtained silica sol taken using an electron microscope.

In the silica sol, existence of silica gel was not observed and it was observed that the silica sol generated no precipitation after it was left to stand at room temperature for 6 months, and was stable.

500 g of the alkaline moniliform silica sol ($SiO_2$ content: 170 g) was passed through a column packed with cation exchange resin, Amberlite 120B, to obtain 515 g of an acidic moniliform silica sol having an $SiO_2$ concentration of 33.0% by weight, a pH of 2.20 [moniliform silica sol E]. The silica sol had a specific gravity of 1.232, a pH of 2.20, a viscosity of 40.0 mPa·s, an $SiO_2$ concentration of 33.0% by weight, an electroconductivity of 610 μS/cm, and a particle diameter measured by the dynamic light scattering method ($D_1$) of 155 nm.

EXAMPLE 5

560 g of the active silicic acid-containing aqueous colloid liquid ($SiO_2$ content: 20.2 g) described in Example 1 was put in a glass container and 300 g of pure water was added thereto with stirring to give an active silicic acid-containing aqueous colloid liquid having an $SiO_2$ concentration of 2.34% by weight and a pH of 3.05. Next, 37.2 g (CaO content 1.27 g) of an aqueous 10 wt. % calcium nitrate solution (pH 4.32) was added thereto at room temperature with stirring and the stirring was continued for 30 minutes.

The calcium nitrate added was 6.30% by weight as CaO based on $SiO_2$.

On the other hand, as an acidic spherical silica sol having a mean particle diameter (nitrogen adsorption method/$D_2$) of 12.0 nm, 1,440 g ($SiO_2$ content: 292 g) of SNOWTEX O(manufactured by Nissan Chemical Industries, Ltd.) (specific gravity: 1.126, viscosity: 1.7 mPa·s, pH 2.70, electroconductivity: 390 $\mu$S/cm, $SiO_2$ concentration: 20.3% by weigh, an $Al_2O_3$ concentration of 430 ppm, an $Fe_2O_3$ concentration of 7 ppm, a CaO concentration of 2 ppm, and an MgO concentration of 3 ppm) was put in a separate glass vessel, to which was added 3.0 g of an aqueous 5 wt. % sodium hydroxide solution with stirring and the stirring was continued for 30 minutes to obtain an acidic silica sol having a pH of 5.47 and an $SiO_2$ concentration of 20.2% by weight. The particle diameter ($D_1$) of the silica sol measured by the dynamic light scattering method was 19.4 nm and the $D_1/D_2$ value was 1.62. Further, electromicroscopic observation revealed that the colloidal silica particles in the silica sol were spherical and showed dispersion close to monodisperse and no connection between the colloid particles nor coagulation was observed. To the aqueous colloid solution of active silicic acid to which the calcium nitrate was added [mixed liquid (a)] was added the acidic spherical silica sol having a mean diameter of 12.0 nm with stirring and the stirring was continued for 30 minutes.

The obtained mixed liquid (b) had a ratio of A/B (weight ratio) 14.5 of the silica content (A) derived from the acidic spherical silica sol to the silica content (B) derived from the aqueous colloid solution of active silicic acid [mixed liquid (a)], a pH of 4.25 and an electroconductivity of 2,600 $\mu$S/cm, and the total silica content (A+B) in the mixed liquid (b) was 13.3% by weight as $SiO_2$ concentration. The calcium ion in the liquid was 0.407% by weight as CaO based on $SiO_2$.

Next, 111 g of an aqueous 5.0% by weight sodium hydroxide solution was added to the obtained mixed liquid (b) over 10 minutes with stirring and the stirring was continued for 1 hour. The mixed liquid (c) obtained by the addition of the aqueous sodium hydroxide solution had a pH of 9.70, an electroconductivity of 3,605 $\mu$S/cm, an $SiO_2$ concentration of 12.7% by weight and an $SiO_2/Na_2O$ molar ratio of 73.0. In the mixed liquid (c), a small amount of silica gel was observed.

Next, 1,800 g of the above-described alkaline mixed liquid (c) was charged in a stainless steel autoclave and heated at 130° C. for 3 hours with stirring. After cooling, 1,800 g of the content was taken out. The obtained liquid was a silica sol of transparent colloid color containing $SiO_2$ in a concentration of 12.7% by weight, a pH of 10.03, a specific gravity of 1.082, a viscosity of 79.5 mPa·s, an electroconductivity of 3,635 $\mu$S/cm, and a particle diameter measured by the dynamic light scattering method ($D_1$) of 163 nm. Therefore, the $D_1/D_2$ ratio was 13.6. According to electromicroscopic observation, the colloidal silica particles in the obtained silica sol comprised by spherical colloidal silica particles and silica bonding them to each other and were moniliform colloidal silica particles , in which the spherical colloidal silica particles were linked in rows in one plane in moniliform shape in a number of 5 to 50. No three-dimensional gel structure particle was observed. Dried product of the sol had a cumulative pore volume of 0.964 cc/g measured using a mercury porosimeter and a mean pore diameter of 24 nm.

Figure 3:
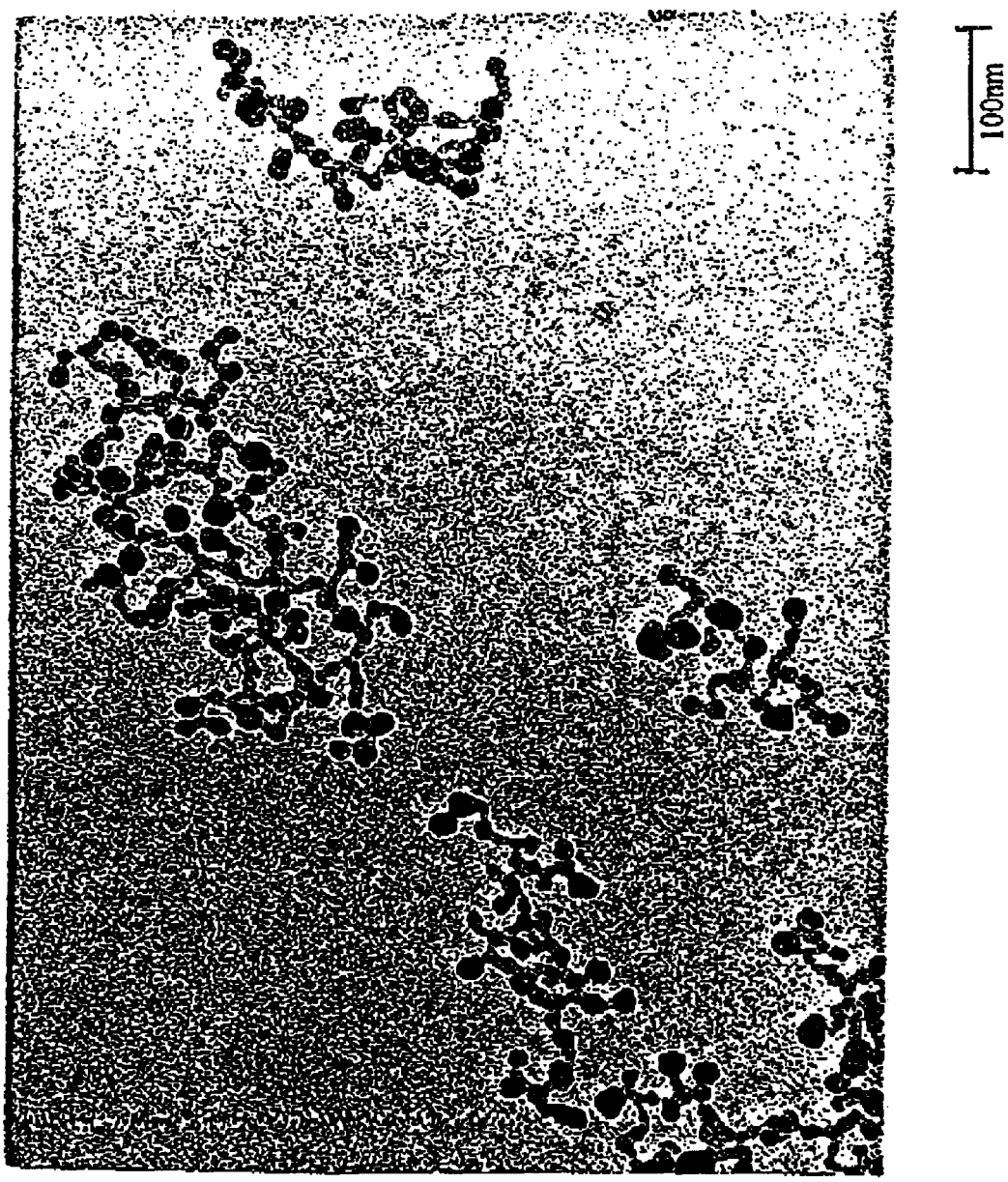
FIG. 3 is a photograph of the moniliform colloidal silica particles of the silica sol obtained in Example 5, taken using an electron microscope.

FIG. 3 is a photograph of moniliform colloidal silica particles in the thus-obtained silica sol taken using an electron microscope.

In the silica sol, existence of silica gel was not observed and it was observed that the silica sol generated no precipitation nor gelling occurred after it was left to stand at room temperature for 6 months, and it was stable.

500 g ($SiO_2$ content: 63.5 g) of the above moniliform alkaline silica sol was taken in a glass container, to which was added a necessary amount of cation exchange resin, Amberlite 120B. After stirring for 10 minutes, the ion exchange resin was separated and removed to obtain 480 g of acidic moniliform silica sol having an $SiO_2$ concentration of 12.2% by weight [moniliform silica sol F]. The silica sol had a specific gravity of 1.074, a pH of 2.25, a viscosity of 25.0 mPa·s, an electroconductivity of 6,000 $\mu$S/cm, and a particle diameter measured by the dynamic light scattering method ($D_1$) of 163 nm.

EXAMPLE 6

346 g of the active silicic acid-containing aqueous colloid liquid ($SiO_2$ content: 12.5 g) described in Example 1 was put in a glass container, to which then was added 41.4. g (CaO content 1.41 g) of an aqueous 10 wt. % calcium nitrate solution (pH 4.32) at room temperature under stirring and the stirring was continued for 30 minutes. The calcium nitrate added was 11.28% by weight as CaO based on $SiO_2$.

On the other hand, as an acidic spherical silica sol having a mean particle diameter (nitrogen adsorption method/$D_2$) of 12.0 nm 2,063 g ($SiO_2$ content: 517.8 g), SNOWTEX-O 25 (manufactured by Nissan Chemical Industries, Ltd.) (specific gravity: 1.160, viscosity: 2.9 mPa·s, pH 2.60, electroconductivity: 1,020 $\mu$S/cm, $SiO_2$ concentration: 25.1% by weight) was put in a separate glass container, to which was added 8.0 g of an aqueous 5 wt. % sodium hydroxide solution with stirring.and the stirring was continued for 30 minutes to obtain an acidic silica sol having a pH of 4.65 and an $SiO_2$ concentration of 25.0% by weight. The particle diameter ($D_1$) of the silica sol measured by the dynamic light scattering method was 20.5 nm and the $D_1/D_2$ value was 1.71. Further, electromicroscopic observation revealed that the colloidal silica particles in the silica sol were spherical and showed dispersion close to monodisperse and no connection between the colloid particles nor coagulation was observed. To the active silicic acid-containing aqueous colloid liquid to which the calcium nitrate was added [mixed liquid (a)] was added the acidic spherical silica sol having a mean diameter of 12.0 nm under stirring and the stirring was continued for additional 30 minutes.

The obtained mixed liquid (b) had a ratio of A/B (weight ratio) 41.4 of the silica content (A) derived from the acidic spherical silica sol to the silica content (B) derived from the aqueous colloid solution of active silicic acid [mixed liquid (a)], a pH of 3.90 and an electroconductivity of 2,600 $\mu$S/cm, and the total silica content (A+B) in the mixed liquid (b) was 21.6% by weight as $SiO_2$ concentration. The calcium ion in the liquid was 0.267% by weight as CaO based on $SiO_2$.

Next, 155 g of an aqueous 5.0 wt. % sodium hydroxide solution was added to the obtained mixed liquid (b) over 10 minutes with stirring and the stirring was further continued for 1 hour. The mixed liquid (c) obtained by the addition of the aqueous sodium hydroxide solution had a pH of 9.89, an electroconductivity of 3,940 $\mu$S/cm, an $SiO_2$ concentration of 20.3% by weight, and an $SiO_2/Na_2O$ molar ratio of 86.9. In the mixed liquid (c), a small amount of silica gel was observed.

Next, 1,800 g of the alkaline mixed liquid (c) was put in a stainless steel autoclave and heated at 138° C. for 5 hours with stirring. After cooling, 1,800g of the content was taken out. The obtained liquid was a silica sol of transparent colloid color containing $SiO_2$ in a concentration of 20.3% by weight, a pH of 10.15, a specific gravity of 1.130, a viscosity of 14.5 mPa·s, an electroconductivity of 3,770 $\mu$S/cm, and a particle diameter measured by the dynamic light scattering method ($D_1$) of 117 nm. Therefore, the $D_1/D_2$ ratio was 9.8. According to electromicroscopic observation, the colloidal silica particles in the obtained silica sol comprised by spherical colloidal silica particles and silica bonding them to each other and were moniliform colloidal silica particles, in which the spherical colloidal silica particles were linked in rows in one plane in moniliform shape in a number of 5 to 50. No three-dimensional gel structure particle was observed.

In the silica sol, existence of silica gel was not observed and it was observed that the silica sol generated no precipitation nor gelling occurred after it was left to stand at room temperature for 6 months, and was stable.

COMPARATIVE EXAMPLE 1

1,000 g of the alkaline mixed liquid (c) obtained in Example 1 was heated at 90° C. for 8 hours under reflux with stirring and then cooled and 1,000 g of the content was taken out. The obtained liquid was a silica sol, which had an $SiO_2$ concentration of 21.5% by weight, a pH of 9.58, a specific gravity of 1.141, a viscosity of 1.5 mPa·s, an electroconductivity of 3,280 $\mu$S/cm, and a particle diameter by the dynamic light scattering method ($D_1$) of 35.0 nm. Therefore, the $D_1/D_2$ ratio was 1.71, which was not so different from the $D_1/D_2$ value of the acidic silica sol having a mean particle diameter of 20.5 nm used as the raw material. According to electromicroscopic observation, no moniliform connection of the colloidal silica particles in the obtained silica sol was observed.

COMPARATIVE EXAMPLE 2

888 g of the active silicic acid-containing aqueous colloid liquid ($SiO_2$ content: 32.0 g) was put in a glass container and 600 g of pure water was added thereto with stirring to give an active silicic acid-containing aqueous colloid liquid having an $SiO_2$ concentration of 2.15% by weight and a pH of 3.07. Next, 6.5 g (CaO content 0.222 g) of an aqueous 10 wt. % calcium nitrate solution (pH 4.32.) was added thereto at room temperature with stirring and the stirring was continued for 30 minutes. The calcium nitrate added was 0.69% by weight as CaO based on $SiO_2$.

On the other hand, as an acidic spherical silica sol having a mean particle diameter (nitrogen adsorption method/$D_2$) of 20.5 nm, 2,000 g ($SiO_2$ content: 802 g) of SNOWTEX-O-40 (manufactured by Nissan Chemical Industries, Ltd.) (specific gravity: 1.289, viscosity: 4.1 mPa·s, pH 2.67, $SiO_2$ concentration: 40.1% by weight) was put in a separate glass container, to which was added 6.0 g of an aqueous 5 wt. % sodium hydroxide solution with stirring and the stirring was continued for 30 minutes to obtain an acidic silica sol having a pH of 4.73 and $SiO_2$ concentration of 40.0% by weight. To the aqueous colloid solution of active silicic acid to which the calcium nitrate was added [mixed liquid (a)] was added the acidic spherical silica sol having a mean diameter of 20.5 nm with stirring and the stirring was continued for 30 minutes.

The obtained mixed liquid (c) had a ratio of A/B (weight ratio) 25.1 of the silica content (A) derived from the acidic spherical silica sol to the silica content (B) derived from the aqueous colloid solution of active silicic acid [mixed liquid (a)], a pH of 3.68 and an electroconductivity of 1,720 $\mu$S/cm, and the total silica content. (A+B) in the mixed liquid (b) was 23.8% by weight as $SiO_2$ concentration. The calcium ion in the liquid was 0.0266% by weight as CaO based on $SiO_2$.

Then, 130 g of an aqueous 5% by weight sodium hydroxide solution was added to the obtained mixed liquid (b) over 10 minutes with stirring and the stirring was continued for 1 hour. The mixed liquid obtained by the addition of the aqueous sodium hydroxide solution had a pH of 9.46, an electroconductivity of 2,450 $\mu$S/cm, an $SiO_2$ concentration of 23.0% by weight and an $SiO_2/Na_2O$ molar ratio of 163.5. In the mixed liquid (c), a small amount of silica gel was observed.

Next, 1,800 g of the alkaline mixed liquid (c) was put in a stainless steel autoclave and heated at 140° C. for 3 hours with stirring. After cooling, 1,800 g of the content was taken out. The obtained liquid was a silica sol containing S102 concentration of 23.0% by weight and having a pH of 9.74, a specific gravity of 1.152, a viscosity of 1.6 mPa·s, an electroconductivity of 2,470 $\mu$S/cm, and a particle diameter measured by the dynamic light scattering method ($D_1$) of 35.0 nm. Therefore, the $D_1/D_2$ ratio was 1.71, which was not so different from the $D_1/D_2$ value of the acidic silica sol having a mean particle diameter of 20.5 nm used as the raw material. According to electromicroscopic observation, no moniliform connection of the colloidal silica particles in the obtained silica sol was observed.

COMPARATIVE EXAMPLE 3

2,000 g ($SiO_2$ content: 802 g) of the acidic spherical silica sol having a mean particle diameter of 20.5 nm described in Example 1 was put in a glass container, to which was added 1,200 g of pure water to obtain an acidic silica sol having an $SiO_2$ concentration of 25.1% by weight and a pH of 2.92.

57 g (CaO content: 1.95g) of an aqueous 10wt. % calcium nitrate solution (pH 4.32) was added to the acidic silica sol at room temperature with stirring and the stirring was continued for 30 minutes.

The obtained liquid had an $SiO_2$ concentration of 24.6% by weight and a pH of 2.91, an electroconductivity of 3,130 $\mu$S/cm, and contained calcium ion of 0.243% by weight as CaO based on $SiO_2$. Next, 100 g of an aqueous 5.0% by weight sodium hydroxide solution was added to the obtained mixed liquid over 10 minutes with stirring and the stirring was continued for 1 hour. The liquid obtained had a pH of 9.08, an electroconductivity of 3,600 $\mu$S/cm, an $SiO_2$ concentration of 23.9% by weight and an $SiO_2/Na_2O$ molar ratio of 214. In the mixed liquid, no silica gel was observed.

Next, 1,800 g of the above-described alkaline mixed liquid was charged in a stainless steel autoclave and heated at 145° C. for 3 hours with stirring and then cooled. The content was fully gelled. The silica gel was taken out and water was added thereto in order to attempt to disperse it. However, it was unsuccessful to convert it into silica sol.

Evaluation examples and comparative evaluation examples on the coating composition for ink receiving layers and ink jet recording medium having the ink receiving layer according to the second embodiment of the present invention will be described below. "Preparation of Aqueous Polyvinyl Alcohol Solution"

450 g of pure water was charged in a glass vessel, to which 50 g of polyvinyl alcohol MA-26GP (produced by Shin-Etsu Chemical Co., Ltd.) was added. The mixture was heated at 90° C. for 1 hour and then cooled to obtain an aqueous 10% by weight polyvinyl alcohol solution.

EVALUATION EXAMPLE 1

In a glass container was put 100 g ($SiO_2$ content: 21.5 g) of the moniliform silica sol A ($SiO_2$ concentration: 21.5% by weight) described in Example 1, to which was added 30.7 g (polyvinyl alcohol content: 3.07 g) of the aqueous 10 wt. % polyvinyl alcohol solution, followed by stirring for 10 minutes and then added a minute amount of a defoaming agent and stirred for 10 minutes to obtain 130.7 g of a coating liquid for ink receiving layers for ink jet recording. The coating composition had $SiO_2$/polyvinyl alcohol weight ratio of 100/14.3 in a ratio of $SiO_2$ to polyvinyl alcohol, an $SiO_2$ concentration of 16.4% by weight, a polyvinyl alcohol concentration of 2.35% by weight, and a total concentration of the both of 18.75% by weight.

After coating the coating liquid on a surface-treated commercially available PET film (A4 size) using a bar coater to a liquid film thickness of 200 μm, it was immediately dried at 110° C. for 10 minutes using a hot-air drier to prepare a sheet for ink jet recording.

The thickness of the ink receiving layer (coated film) of the prepared sheet after drying was 24 μm. The coated film had a slightly transparent milk white color and was almost free from cracks and had good smoothness.

EVALUATION EXAMPLE 2

In a glass container was put 108 g ($SiO_2$ content: 23.2 g) of the moniliform silica sol A ($SiO_2$ concentration: 21.5% by weight) described in Example 1, to which was added 1.9 g of aqueous 10 wt. % nitric acid solution with stirring to adjust the pH to 7.30. Thereafter, 39. 0 g of the aqueous 10 wt. % polyvinyl alcohol solution (polyvinyl alcohol content: 3.9 g) was added with stirring and stirred for 10 minutes. Next, a minute amount of a defoaming agent was added and the mixture was stirred for 10 minutes to obtain 149 g of a coating composition for ink receiving layers for ink jet recording. The coating composition had $SiO_2$/polyvinyl alcohol weight ratio of 100/16.8 in a ratio of $SiO_2$ to polyvinyl alcohol, an $SiO_2$ concentration of 15.6% by weight, a polyvinyl alcohol concentration of 2.62% by weight, and a total concentration of the both of 18.22% by weight.

After coating the coating composition on a surface-treated commercially available PET film (A4 size) using a bar coater to a liquid film thickness of 200 μm, it was immediately dried at 110° C. for 10 minutes using a hot-air drier to prepare a sheet for ink jet recording.

The thickness of the ink receiving layer (coated film) of the prepared sheet after drying was 25 μm and the coated film had a transparent colloid color and was almost free from cracks and had good smoothness and luster.

EVALUATION EXAMPLE 3

The coating liquid prepared in the Evaluation Example 2 was coated on the backside of a commercially available glossy paper for ink jet photograph (A4 size) to form a liquid film thickness of 110 μm using a bar coater and immediately thereafter dried at 110° C. for 6 minutes using a hot-air drier to prepare ink jet recording paper.

The prepared paper had a coating film thickness of 20 to 25 μm and was almost free from cracks and smooth.

EVALUATION EXAMPLE 4

In a glass container was put 120 g ($SiO_2$ content: 25.8 g) of the moniliform silica sol B ($SiO_2$ concentration: 21.5% by weight) described in the Example 2, to which was added 2.10 g of aqueous 10 wt. % hydrochloric acid solution with stirring to give an acidic sol having a pH of 2.20 and an electroconductivity of 10 μS/cm. Thereafter, to the silica sol was added 67 g of pure water and then added 43.0 g (polyvinyl alcohol content: 4.30 g) of aqueous 10 wt. % polyvinyl alcohol solution and stirred for 10 minutes, and next, added a minute amount of defoaming agent and stirred for 10 minutes to obtain 231 g of a coating liquid for ink receiving layers for ink jet recording. The coating composition had $SiO_2$/polyvinyl alcohol weight ratio of 100/16.7 in a ratio of $SiO_2$ to polyvinyl alcohol, an $SiO_2$ concentration of 11.2% by weight, a polyvinyl alcohol concentration of 1.86% by weight, and a total concentration of the both of 13.06% by weight.

After coating the coating liquid on the backside of a commercially available glossy paper for ink jet photograph (A4 size) to have a liquid film thickness of 110 μm using a bar coater and immediately thereafter dried at 110° C. for 6 minutes using a hot-air drier to prepare ink jet recording paper.

The prepared paper had a coating film thickness of 20 to 25 μm and was almost free from cracks and smooth.

Also, the coating liquid was coated on a PET film using a bar coater and dried to obtain a sheet having a dry coating film thickness of 20 μm. The coating film had a colloid color but its transparency was good.

EVALUATION EXAMPLE 5

In a glass container was put 95 g ($SiO_2$ content: 28.5 g) of the moniliform silica sol C ($SiO_2$ concentration: 30% by weight) described in Example 2, to which was added 47.6 g of aqueous 10 wt. % polyvinyl alcohol solution (polyvinyl alcohol content: 4.76 g) with stirring and stirred for 10 minutes, and then, added a minute amount of a defoaming agent and stirred for 10 minutes to obtain 142.6 g of a coating liquid for ink receiving layers for ink jet recording. The coating composition had $SiO_2$/polyvinyl alcohol weight ratio of 100/16.7 in a ratio of $SiO_2$ to polyvinyl alcohol, an $SiO_2$ concentration of 20.0% by weight, a polyvinyl alcohol concentration of 3.34% by weight, and a total concentration of the both of 23.3% by weight.

After coating the coating liquid on a surface-treated commercially available PET film (A4 size) to have a liquid film thickness of 180 μm using a bar coater and immediately thereafter dried at 110° C. for 10 minutes using a hot-air drier to prepare a sheet for ink jet recording.

The prepared sheet had a coating film thickness of 25 μm and the coating film had a transparent colloid color and was almost free from cracks and smooth, and it also had a good luster.

EVALUATION EXAMPLE 6

In a glass container was put 80 g ($SiO_2$ content: 32.0 g) of the moniliform silica sol D ($SiO_2$ concentration: 40% by weight) described in Example 2, to which was added 35.6 g of aqueous 10 wt. % polyvinyl alcohol solution (polyvinyl alcohol content: 3.56 g) with stirring and stirred for 10 minutes, and then, added a minute amount of a defoaming agent and stirred for 10 minutes to obtain 115.6 g of a coating liquid for ink receiving layers for ink jet recording. The coating composition had $SiO_2$/polyvinyl alcohol weight ratio of 100/11.1 in a ratio of $SiO_2$ to polyvinyl alcohol, an $SiO_2$ concentration of 27.7% by weight, a polyvinyl alcohol concentration of 3.08% by weight, and a total concentration of the both of 30.8% by weight.

After coating the coating liquid on a surface-treated commercially available PET film (A4 size) to have a liquid film thickness of 160 μm using a bar coater and immediately thereafter dried at 110° C. for 10 minutes using a hot-air drier to prepare a sheet for ink jet recording.

The prepared sheet had a coating film thickness of 30 μm and the coating film had a transparent colloid color and was almost free from cracks and smooth, and it also had a good luster.

EVALUATION EXAMPLE 7

The coating liquid prepared in Evaluation Example 6 above was coated on the backside of a commercially available glossy paper for ink jet photograph (A4 size) to have a liquid film thickness of 110 μm using a bar coater and immediately thereafter dried at 110° C. for 6 minutes using a hot-air drier to prepare ink jet recording paper.

The prepared paper had a coating film thickness of 30 to 40 μm and was almost free from cracks and smooth.

EVALUATION EXAMPLE 8

In a glass container was put 76 g ($SiO_2$ content: 25.1 g) of the moniliform silica sol E ($SiO_2$ concentration: 33.0% by weight) described in Example 4, to which was added 35.8 g of aqueous 10 wt. % polyvinyl alcohol solution (polyvinyl alcohol content: 3.558 g) with stirring and stirred for additional 10 minutes, and then, added a minute amount of a defoaming and stirred for 10 minutes to obtain 111.8 g of a coating liquid for ink receiving layers for ink jet recording. The coating composition had $SiO_2$/polyvinyl alcohol weight ratio of 100/14.3 in a ratio of $SiO_2$ to polyvinyl alcohol, an $SiO_2$ concentration of 22.5% by weight, a polyvinyl alcohol concentration of 3.20% by weight, and a total concentration of the both of 25.7% by weight.

After coating the coating liquid on a surface-treated commercially available PET film (A4 size) to have a liquid film thickness of 180 μm using a bar coater and immediately thereafter dried at 110° C. for 10 minutes using a hot-air drier to prepare a sheet for ink jet recording.

The prepared sheet had a coating film thickness of 30 μm and the coating film had a transparent colloid color and was almost free from cracks and smooth, and it also had a good luster.

EVALUATION EXAMPLE 9

In a glass container was put 40.0 g (polyvinyl alcohol content: 4.00 g) of the aqueous 10 wt. % polyvinyl alcohol solution, to which 80 g ($SiO_2$ content: 9.76 g) of the moniliform silica sol F ($SiO_2$ concentration: 12.2% by weight) described in Example 5 was added with stirring and stirred for 5 minutes to obtain 120 g of a coating liquid for ink receiving layers for ink jet recording. The coating composition had $SiO_2$/polyvinyl alcohol weight ratio of 100/41.0 in a ratio of $SiO_2$ to polyvinyl alcohol, an $SiO_2$ concentration of 8.13% by weight, a polyvinyl alcohol concentration of 3.33% by weight, and a total concentration of the both of 11.46% by weight.

After coating the coating liquid on a surface-treated commercially available PET film (A4 size) to have a liquid film thickness of 260 μm using a bar coater and immediately thereafter dried at 110° C. for 10 minutes using a hot-air drier to prepare a sheet for ink jet recording.

The prepared sheet had a coating film thickness of 25 μm, and the coating film had only a little colloid color and excellent transparent and was almost free from cracks and smooth, and it also had a good luster.

EVALUATION EXAMPLE 10

The coating liquid prepared in Evaluation Example 9 above was coated on the backside of a-commercially available glossy paper for ink jet photograph (A4 size) to a liquid film thickness of 110 μm using a bar coater and immediately thereafter dried at 110° C. for 6 minutes using a hot-air drier to prepare ink jet recording paper.

The prepared paper had a coating film thickness of 25 to 30 μm and was almost free from cracks and smooth.

COMPARATIVE EVALUATION EXAMPLE 1

In a glass container was put 52. g ($SiO_2$ content: 25.1 g) of spherical silica sol SNOWTEX-50 having a mean particle diameter (nitrogen absorption method/$D_2$) of 21.5 nm (manufactured by Nissan Chemical Industries, Ltd.) (specific gravity: 1.378, viscosity: 15.5 mPa·s, pH 9.2, $SiO_2$ concentration: 4 8.3% by weight, particle diameter measured by the dynamic light scattering method ($D_1$): 35.0 nm, and a $D_1/D_3$ value of 1.71), to which was added 52 g of pure water to give an $SiO_2$ concentration of 24.15% by weight. Thereafter, 35.9 g (polyvinyl alcohol content: 3.59 g) of aqueous 10 wt. % polyvinyl alcohol solution was added with stirring and stirred for 10 minutes, and then, added a minute amount of defoaming agent and stirred for 10 minutes to obtain 139.9 g of a coating liquid for ink receiving layers for ink jet recording. The coating composition had $SiO_2$/polyvinyl alcohol weight ratio of 100/14.3 in a ratio of $SiO_2$ to polyvinyl alcohol, an SiO2 concentration of 17.9% by weight, a polyvinyl alcohol concentration of 2.57% by weight, and a total concentration of the both of 20.5% by weight.

After coating the coating liquid on a surface treated commercially available PET film (A4 size) to a liquid film thickness of 180 μm using a bar coater and immediately thereafter dried at 110° C. for 10 minutes using a hot-air drier to prepare a sheet for ink jet recording.

The prepared sheet had a coating film thickness of 25 μm and the coating film had a nontransparent white color and had a few cracks and was poor in smoothness and had no luster.

COMPARATIVE EVALUATION EXAMPLE 2

The coating liquid prepared in Comparative Evaluation Example 1 above was coated on the backside of a commercially available glossy paper for ink jet photograph (A4 size) to have a liquid film thickness of 110 μm using a bar coater and immediately thereafter dried at 110° C. for 6 minutes using a hot-air drier to prepare ink jet recording paper.

The prepared paper had a coating film thickness of 25 to 30 μm and a few cracks were observed.

Standard color image was printed on the back of each of the ink jet recording media prepared in the Evaluation Examples 1 to 10 and the Comparative Evaluation Examples 1 or 2 (ink jet recording paper or sheet) or commercially available glossy paper for ink jet photograph (A4 size) (Comparative Evaluation Example 3) using an ink jet printer (PM-2000C, manufactured by Seiko Epson Corporation) and ink jet recording properties such as ink absorbability, absorption speed, sharpness of print, color, luster and the like were determined. The results are shown in Table 1.

TABLE 1

| | | Ink Jet Recording Properties | | | | |
|---|---|---|---|---|---|---|
| | Substrate | Ink Absorbability | Absorption Speed | Sharpness | Color | Luster |
| Evaluation Example | | | | | | |
| 1 | Sheet | ○ | ○ | Δ | ○ | Δ |
| 2 | Sheet | ○ | ○ | ◎ | ◎ | ○ |
| 3 | Paper | ◎ | ◎ | ◎ | ◎ | ○ |
| 4 | Paper | ◎ | ◎ | ◎ | ◎ | ○ |
| 5 | Sheet | ○ | ○ | ○ | ◎ | ○ |
| 6 | Sheet | ◎ | ◎ | ◎ | ◎ | ○ |
| 7 | Paper | ◎ | ◎ | ◎ | ◎ | ○ |
| 8 | Sheet | ○ | ○ | ◎ | ◎ | ○ |
| 9 | Sheet | ○ | ○ | ○ | ◎ | ○ |
| 10 | Paper | ◎ | ◎ | ◎ | ◎ | ○ |
| Comparative Evaluation Example | | | | | | |
| 1 | Sheet | X | X | X | X | X |
| 2 | Paper | ○ | ○ | X | X | X |
| 3 | Paper | ◎ | ◎ | Δ | Δ | X |

Criteria for Evaluation:
◎ = Excellent, ○ = Good, Δ = Slightly Poor, X = Considerably Poor

INDUSTRIAL APPLICABILITY

The silica sol of the first embodiment of the present invention brings about improvements in various applications over the conventional silica sols. Components which may be added to conventional silica sols for preparing compositions may also be added to the silica sol of the first embodiment of the present invention. Examples of components which may be used together include those conventionally known as described above, i.e., spherical silica sols, non-spherical silica sols prepared by a peptization method, elongated-shaped silica sol, aqueous alkali metal silicate solution, partial hydrolyzed liquid of alkyl silicates, alumina sol, other metal oxide sols, water-soluble polymers such as polyvinyl alcohol, hydroxyethylcellulose and gelatin, water-soluble resins such as melamine resin and urea resin, resin emulsions such as acrylic emulsion, tackifiers such as bentonite and sodium alginate, organic solvent dissolved resin solutions such as acrylic resin, organic solvents such as ethylene glycol, methyl alcohol and N,N-dimethylformamide (DMF), inorganic acids and aqueous inorganic salt solutions such as aluminum phosphate and chromic acid, partial hydrolyzed liquid of silane coupling agent, surfactants, refractory powder, metal powder, pigments and the like.

When the silica sol of the present invention is mixed with various materials for coating compositions which have heretofore been used, organic coating compositions, inorganic coating compositions, inorganic coating compositions, heat-resistant coating compositions, anti-corrosive coating compositions, inorganic-organic composite coating compositions and the like can be prepared. Dry film formed by coating a coating composition containing the silica sol of the first embodiment of the present invention has few pin holes and is almost free from cracks. The coated film is smoothness and is soft so as to able to absorb a shock as applied thereto. In addition, the coated films is excellent in adhesiveness to the substrate, the water-retentivity and anti-static capacity. Further, the baked coating film formed from an inorganic coating composition containing the silica sol of the first embodiment of the present invention has good heat-resistance. The coating compositions containing the silica sol of the first embodiment of the present invention may be applied to the surfaces of various substrates, for example, glass, ceramics, metals, plastics, wood materials and paper. When used in combination with resin emulsions such as acrylic base, polyester base and polyolefin base ones for use in anticorrosive coating compositions for zinc-plated steel plates, the silica sol of the first embodiment of the present invention can increase their anticorrosiveness. In particular, the silica sol of the first embodiment of the present invention has good film-forming property and its dried product has porosity, so that it is suitable for ink receiving layers of recording paper or recording sheet for printing such as ink jet. In this use, the silica sol is added to water-soluble polymers such as polyvinyl alcohol, water-soluble resins or resin emulsion and the colloidal silica serves as a microfiller. As the resin emulsion, it may possible to use emulsions of acrylic base polymers, ester base polymers, urethane base polymers, olefin base polymers, vinylidene chloride base polymers, epoxy base polymers, amide base polymers and modified products or copolymers thereof.

Since the silica sol of the first embodiment of the present invention has connecting property and porosity, it is excellent as a carrier for catalysts and a binder for catalysts. In particular, it is suitable for a carrier for fluidized bed catalysts and a binder for catalysts for use in automobiles.

The silica sol of the first embodiment of the present invention may be used also as a tackifier or a gelling agent. It is effective as a gelling agent for sulfuric acid gel battery since it has also porosity.

The silica sol of the first embodiment of the present invention has a large particle diameter by the dynamic light scattering method and also has high adhesion and connecting property, so that it is effective as an anti-slip agent for corrugated boards and films.

The silica sol of the first embodiment of the present invention may be impregnated in felt-like materials such as ordinary glass fibers, ceramic fibers, and other inorganic fibers. Further, these short fibers and the silica sol of the first embodiment of the present invention may be mixed with each other. When the felt-like materials impregnated with the silica sol of the first embodiment of the present invention is dried, felt-like materials having high strength can be obtained. Furthermore, when a mixture of the above short fibers and the silica sol of the first embodiment of the present invention is molded into sheets, mats, or other shapes and then dried, sheets, mats, molded articles and the like having high strengths can be also obtained. On the surface of the felts, sheets, mats, molded articles and the like thus obtained, there will occur no dusting which was seen when the conventional silica sol is used similarly. Therefore, it revealed that the colloidal silica particles in the silica sol of the first embodiment of the present invention used as a binding agent for inorganic fibers and the like will not migrate from the inside to the surface of inorganic fiber molded article upon drying. The dried molded articles are provided as improvements for use in applications to heat-resistant heat insulating materials and in other applications.

The silica sol of the first embodiment of the present invention may also be used also as a surface-treating agent for substrates having a porous texture. For example, when applied to the surface of hardened article such as concrete, mortar, cement, gypsum, and clay, the silica sol is impregnated into from the surface to the inside of the article, and after being dried, it gives an improved surface layer on the article. The silica sol of the first embodiment of the present invention may also be used as a surface-treating agent for natural fibers and synthetic fibers and fiber products thereof, paper and wood materials. In addition, it may be used as a sealant for castings.

Moulds for metal casting may be prepared from slurry containing the silica sol of the first embodiment of the present invention and refractory powder. The slurry is rapidly gelled, when dried, at high gelling speed, so that the productivity of moulds from the slurry is high. In addition, cracking percentage in product of moulds upon baking is low.

The silica sol of the first embodiment of the present invention exhibits high stability and has the property of finally, irreversibly converting into silica gel by removal of the medium. Since the colloidal silica particles constituting the silica sol have the moniliform shape as described above, when the silica sol is gelled or after it is hardened, they exhibit unique properties derived from the silica sol. From these it can be readily understood that the silica sol of the first embodiment of the present invention is useful in various applications other than the above-described ones.

Use of the coating composition for ink receiving layers of the second embodiment of the present invention to form an ink receiving layer on paper or plastic film or sheet may provide an ink jet recording medium that has high ink absorbability, high ink absorption speed, sharpness of print, and good color and luster.

What is claimed is:

1. A stable silica sol having an $SiO_2$ concentration of 1 to 50% by weight, and containing liquid-medium dispersed moniliform colloidal silica particles having a ratio $(D_1/D_2)$ of a particle diameter $D_1$ (as measured moniliform colloidal silica particles by a dynamic light scattering method) to a mean particle diameter $D_2$ (as measured spherical colloidal silica particles by a nitrogen absorption method) in a range of 3–50, wherein $D_1$ is 50 to 500 nm and $D_2$ is 10 to 80 μm, wherein said moniliform particles are composed of said spherical colloidal silica particles and a metal oxide-containing silica which bonds said spherical colloidal silica particles together, and wherein said spherical colloidal silica particles are linked together in rows in only one plane, and an aqueous resin.

2. A stable silica sol having an $SiO_2$ concentration of 5 to 40% by weight, and containing liquid-medium dispersed moniliform colloidal silica particles having a ratio $(D_1/D_2)$ of a particle diameter $D_1$ (as measured moniliform colloidal silica particles by a dynamic light scattering method) to a mean particle diameter $D_2$ (as measured spherical colloidal silica particles by a nitrogen absorption method) in a range of 3–50, wherein $D_1$ is 50 to 500 nm, and $D_2$ is 10 to 80 nm, and metal oxide-containing silica bonding these spherical colloidal silica particles, and wherein the spherical colloidal silica particles link in rows in only one plane, obtained by a process comprising the steps (a), (b), (c), and (d) below:

(a) adding an aqueous solution containing one or more compounds selected from the group consisting of water-soluble II valent metal salts and water-soluble III valent metal salts to an active silicic acid having an $SiO_2$ concentration of 0.5 to 10% by weight and a pH of 2 to 6 or an acidic silica sol having a mean particle diameter of 3 to 8 nm, an $SiO_2$ concentration of 0.5 to 10% by weight and a pH of 2 to 6, in an amount of 1 to 10% by weight as a metal oxide (MO in the case of the II valent metal salt and $M_2O_3$ in the case of the III valent metal salt, wherein M represents a II valent or III valent metal atom and O represents an oxygen atom) based on $SiO_2$ in said active silicic acid-containing aqueous colloid liquid or said acidic silica sol, and mixing them;

(b) adding an acidic spherical silica sol having a mean particle diameter of 10 to 80 nm and a pH 2 to 6 to the mixed liquid (a) obtained in the step (a), a weight ratio (A/B) of a silica content (A) (as derived from said acidic spherical silica sol) to a silica content (B) (as derived from the mixed liquid (a)) of 5 to 100, to an $SiO_2$ concentration of 5 to 40% by weight as a total silica content (A+B), and mixing them;

(c) adding one compound selected from the groups consisting of alkali metal hydroxides, water-soluble organic bases and water-soluble silicates to the mixed liquid (b) obtained in the step (b) to a pH of 7 to 11, and mixing them; and (d) heating the mixed liquid (c) obtained in the step (c) at 100 to 200° C. for 0.5 to 50 hours.

3. A method for producing a stable silica sol according to claim 2, wherein in step (a), the groups consisting of water-soluble II valent metal salts and water-soluble III valent metal salts are the groups consisting of water-soluble calcium salts and water-soluble magnesium salts.

4. A coating composition for ink receiving layer in ink jet recording comprising a silica sol having an $SiO_2$ concentration of 1 to 50% by weight, and containing liquid medium dispersed moniliform colloidal silica particles having a ratio $(D_1/D_2)$ of a particle diameter $D_1$ (as measured moniliform colloidal silica particles by a dynamic light scattering method) to a mean particle diameter $D_2$ (as measured spherical colloidal silica particles by a nitrogen absorption method) in a range of 3–50, wherein $D_1$ is 50 to 500 nm and $D_2$ is 10 to 50 nm, wherein said moniliform colloidal silica particles are composed of said spherical colloidal silica particles and a metal oxide-containing silica which bonds said spherical colloidal silica particles together, and wherein said spherical colloidal silica particles are linked together in rows in only one plane, and an aqueous resin.

5. An ink jet recording medium comprising an ink receiving layer containing moniliforn colloidal silica particles each having a ratio $(D_1/D_2)$ of a particle diameter $D_1$ (as measured moniliform colloidal silica particles by a dynamic light scattering method) to a mean particle diameter $D_2$ (as measured spherical colloidal silica particles measured by a nitrogen absorption method) in a range of 3–50, wherein $D_1$ is 50 to 500 nm and $D_2$ is 10 to 50 nm, wherein said moniliform colloidal silica particles are composed of said spherical colloidal silica particles and a metal oxide-containing silica which bonds said spherical colloidal silica particles together, and wherein said spherical colloidal silica particles are linked together in rows in only one plane, and an aqueous resin.

* * * * *

UNITED STATES PATENT AND TRADEMARK OFFICE
CERTIFICATE OF CORRECTION

PATENT NO. : 6,632,489 B1  Page 1 of 1
DATED : October 14, 2003
INVENTOR(S) : Yoshitane Watanabe et al.

It is certified that error appears in the above-identified patent and that said Letters Patent is hereby corrected as shown below:

Column 35,
Line 37, "80 μm" should read -- 80 nm --;

Column 35,
Lines 42-43, the phrase ",and an aqueous resin" should be deleted.

Signed and Sealed this

Second Day of March, 2004

JON W. DUDAS
*Acting Director of the United States Patent and Trademark Office*